United States Patent
Kim et al.

(10) Patent No.: US 12,218,524 B2
(45) Date of Patent: Feb. 4, 2025

(54) WIRELESS POWER TRANSMITTING DEVICE AND METHOD OF DETECTING FOREIGN SUBSTANCES BY WIRELESS POWER TRANSMITTING DEVICE

(71) Applicant: LG Electronics Inc., Seoul (KR)

(72) Inventors: Hyoungseok Kim, Seoul (KR); Jaeyeol Kim, Seoul (KR); Seonghun Lee, Seoul (KR); Gyunghwan Yook, Seoul (KR); Hongkwon Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 43 days.

(21) Appl. No.: 18/024,675

(22) PCT Filed: Sep. 6, 2021

(86) PCT No.: PCT/KR2021/012035
§ 371 (c)(1),
(2) Date: Mar. 3, 2023

(87) PCT Pub. No.: WO2022/050790
PCT Pub. Date: Mar. 10, 2022

(65) Prior Publication Data
US 2023/0318363 A1  Oct. 5, 2023

(30) Foreign Application Priority Data
Sep. 4, 2020 (KR) .................. 10-2020-0112736

(51) Int. Cl.
*H02J 50/60* (2016.01)
*H02J 50/10* (2016.01)
*H02J 50/80* (2016.01)

(52) U.S. Cl.
CPC ............ *H02J 50/60* (2016.02); *H02J 50/10* (2016.02); *H02J 50/80* (2016.02)

(58) Field of Classification Search
CPC ............ H02J 50/10; H02J 50/60; H02J 50/80
(Continued)

(56) References Cited

U.S. PATENT DOCUMENTS 10,079,513 B2 *  9/2018  Park .................. H02J 7/00034
10,879,743 B2 * 12/2020  Vocke ................... H02J 50/12
2017/0273025 A1    9/2017  Su

FOREIGN PATENT DOCUMENTS

KR      20140124575      10/2014
KR      20160012889       2/2016
(Continued)

*Primary Examiner* — Hal Kaplan
(74) *Attorney, Agent, or Firm* — Fish & Richardson P.C.

(57) ABSTRACT

A wireless power transmitting device according to an embodiment of the present specification transmits wireless power to a wireless power receiving device, and includes a power conversion circuit including a primary coil for transmitting the wireless power to the wireless power receiving device and a communication/control circuit for communicating with the wireless power receiving device and controlling the power conversion circuit, wherein, to detect foreign substances between the wireless power receiving device and the wireless power transmitting device, the communication/control circuit stops the transmission of the wireless power for a slot time, detects the foreign substances on the basis of a change in the voltage or current of the primary coil within the slot time, and sets the slot time to start from a point in time when the current of the primary coil is 0.

20 Claims, 22 Drawing Sheets

(58) Field of Classification Search
USPC .......................................................... 307/104
See application file for complete search history.

(56) References Cited

FOREIGN PATENT DOCUMENTS

| KR | 20200051209 | 5/2020 |
| WO | WO 2015194969 | 12/2015 |

* cited by examiner

FIG. 3b

|  | b7 | b6 | b5 | b4 | b3 | b2 | b1 | b0 |
|---|---|---|---|---|---|---|---|---|
| Byte 0 | Application Profile ||||||||
| Byte 1 | Version ||||||||
| Byte 2-N-1 | Profile-specific data ||||||||

FIG. 11

|     | $b_7$ | $b_6$ | $b_5$ | $b_4$ | $b_3$ | $b_2$ | $b_1$ | $b_0$ |
|-----|-------|-------|-------|-------|-------|-------|-------|-------|
| $B_0$ | '00' | | Reference Power | | | | | |
| $B_1$ | Reserved | | | | | | | |
| $B_2$ | ZERO | AI | Reserved | OB | ZERO | Count | | |
| $B_3$ | Window Size | | | | Window Offset | | | |
| $B_4$ | Neg | Pol | Depth | | Buffer Size | | | Dup |

FIG. 13

|      | $b_7$ | $b_6$ | $b_5$ | $b_4$ | $b_3$ | $b_2$ | $b_1$ | $b_0$ |
|------|-------|-------|-------|-------|-------|-------|-------|-------|
| $B_0$ | Reserved | | Negotiable Load Power | | | | | |
| $B_1$ | Reserved | | Potential Load Power | | | | | |
| $B_2$ | Dup | AR | OB | Buffer Size | | | WPID | NRS |

WIRELESS POWER TRANSMITTING DEVICE AND METHOD OF DETECTING FOREIGN SUBSTANCES BY WIRELESS POWER TRANSMITTING DEVICE

CROSS-REFERENCE TO RELATED APPLICATIONS

This application is a National Stage application under 35 U.S.C. § 371 of International Application No. PCT/KR2021/012035, filed on Sep. 6, 2021, which claims the benefit of Korean Patent Application No. 10-2020-0112736, filed on Sep. 4, 2020. The disclosures of the prior applications are incorporated by reference in their entirety.

BACKGROUND OF THE DISCLOSURE

Field of the Disclosure

The present specification relates to a wireless power transmitter for transmitting wireless power to a wireless power receiver, a method for detecting a foreign object between the wireless power receiver and the wireless power transmitter by the wireless power transmitter, and the like.

Related Art

The wireless power transfer (or transmission) technology corresponds to a technology that may wirelessly transfer (or transmit) power between a power source and an electronic device. For example, by allowing the battery of a wireless device, such as a smartphone or a tablet PC, and so on, to be recharged by simply loading the wireless device on a wireless charging pad, the wireless power transfer technique may provide more outstanding mobility, convenience, and safety as compared to the conventional wired charging environment, which uses a wired charging connector. Apart from the wireless charging of wireless devices, the wireless power transfer technique is raising attention as a replacement for the conventional wired power transfer environment in diverse fields, such as electric vehicles, Bluetooth earphones, 3D glasses, diverse wearable devices, household (or home) electric appliances, furniture, underground facilities, buildings, medical equipment, robots, leisure, and so on.

The wireless power transfer (or transmission) method is also referred to as a contactless power transfer method, or a no point of contact power transfer method, or a wireless charging method. A wireless power transfer system may be configured of a wireless power transmitter supplying electric energy by using a wireless power transfer method, and a wireless power receiver receiving the electric energy being supplied by the wireless power transmitter and supplying the receiving electric energy to a receiver, such as a battery cell, and so on.

The wireless power transfer technique includes diverse methods, such as a method of transferring power by using magnetic coupling, a method of transferring power by using radio frequency (RF), a method of transferring power by using microwaves, and a method of transferring power by using ultrasound (or ultrasonic waves). The method that is based on magnetic coupling is categorized as a magnetic induction method and a magnetic resonance method. The magnetic induction method corresponds to a method transmitting power by using electric currents that are induced to the coil of the receiver by a magnetic field, which is generated from a coil battery cell of the transmitter, in accordance with an electromagnetic coupling between a transmitting coil and a receiving coil. The magnetic resonance method is similar to the magnetic induction method in that is uses a magnetic field. However, the magnetic resonance method is different from the magnetic induction method in that energy is transmitted due to a concentration of magnetic fields on both a transmitting end and a receiving end, which is caused by the generated resonance.

SUMMARY OF THE DISCLOSURE

The technical problem of this specification is to provide a method for more accurately measuring a quality factor (Q factor) measured by a wireless power transmitter temporarily stopping transmission of wireless power while transmitting wireless power to a wireless power receiver and to provide a foreign matter detection method using the same.

The technical tasks of the present specification are not limited to the tasks mentioned above, and other tasks not mentioned will be clearly understood by those skilled in the art from the description below.

According to an embodiment of the present specification for solving the above problems, a wireless power transmitter transmits a wireless power to a wireless power receiver and comprises a power conversion circuit including a primary coil for transmitting the wireless power to the wireless power receiver and a communication/control circuit communicating with the wireless power receiver and controlling the power conversion circuit, wherein the communication/control circuit is configured to stop a transmission of the wireless power during a slot time for detecting a foreign object between the wireless power receiver and the wireless power transmitter, and detect the foreign object based on a change in voltage or current of the primary coil within the slot time, and wherein the slot time starts from a time point at which the current of the primary coil becomes zero.

According to an embodiment of the present specification for solving the above problems, a wireless power transmitter transmits a wireless power to a wireless power receiver and comprises a power conversion circuit including a primary coil for transmitting the wireless power to the wireless power receiver and a communication/control circuit communicating with the wireless power receiver and controlling the power conversion circuit, wherein the communication/control circuit is configured to stop a transmission of the wireless power during a slot time for detecting a foreign object between the wireless power receiver and the wireless power transmitter, and detect the foreign object based on a change in voltage or current of the primary coil within the slot time, and wherein the communication/control circuit is configured to detect the foreign object based on the change in effective peak values obtained excluding a peak value of an initial section among peak values of current values or voltage values of the primary coil generated within the slot time.

According to an embodiment of the present specification for solving the above problems, a method for detecting a foreign object is performed by a wireless power transmitter, wherein the wireless power transmitter includes a primary coil for transmitting wireless power to a wireless power receiver, and comprises supplying power to the primary coil to provide the wireless power to the wireless power receiver, blocking the power supplied to the primary coil during a slot time and detecting the foreign object based on a change in voltage or current of the primary coil within the slot time, wherein the slot time starts from a time point at which the current of the primary coil becomes zero.

Other specific details of this specification are included in the detailed description and drawings.

While transmitting wireless power to the wireless power receiver, the wireless power transmitter temporarily stops transmission of the wireless power, and a quality factor (Q factor) to be measured can be more accurately measured.

In addition, a foreign object existing between the wireless power transmitter and the wireless power receiver may be more accurately detected using the more accurately measured quality coefficient.

The effect according to the present document is not limited by the contents exemplified above, and more various effects are included in the present specification.

BRIEF DESCRIPTION OF THE DRAWINGS

FIG. 3b shows an example of a WPC NDEF in a wireless power transfer system.

FIG. 11 is a diagram illustrating a message field of a configuration packet (CFG) of a wireless power receiver according to an embodiment.

FIG. 13 is a diagram illustrating a message field of a capability packet (CAP) of a wireless power transmitter according to an embodiment.

DESCRIPTION OF EXEMPLARY EMBODIMENTS

In this specification, "A or B" may refer to "only A", "only B" or "both A and B". In other words, "A or B" in this specification may be interpreted as "A and/or B". For example, in this specification, "A, B, or C" may refer to "only A", "only B", "only C", or any combination of "A, B and C".

The slash (/) or comma used in this specification may refer to "and/or". For example, "A/B" may refer to "A and/or B". Accordingly. "A/B" may refer to "only A", "only B", or "both A and B". For example, "A, B, C" may refer to "A, B, or C".

In this specification, "at least one of A and B" may refer to "only A", "only B", or "both A and B". In addition, in this specification, the expression of "at least one of A or B" or "at least one of A and/or B" may be interpreted to be the same as "at least one of A and B".

Also, in this specification, "at least one of A, B and C" may refer to "only A", "only B", "only C", or "any combination of A, B and C". Also, "at least one of A, B or C" or "at least one of A, B and/or C" may refer to "at least one of A, B and C".

In addition, parentheses used in the present specification may refer to "for example". Specifically, when indicated as "control information (PDCCH)", "PDCCH" may be proposed as an example of "control information". In other words, "control information" in this specification is not limited to "PDCCH", and "PDDCH" may be proposed as an example of "control information". In addition, even when indicated as "control information (i.e., PDCCH)", "PDCCH" may be proposed as an example of "control information".

In the present specification, technical features that are individually described in one drawing may be individually or simultaneously implemented. The term "wireless power", which will hereinafter be used in this specification, will be used to refer to an arbitrary form of energy that is related to an electric field, a magnetic field, and an electromagnetic field, which is transferred (or transmitted) from a wireless power transmitter to a wireless power receiver without using any physical electromagnetic conductors. The wireless power may also be referred to as a wireless power signal, and this may refer to an oscillating magnetic flux that is enclosed by a primary coil and a secondary coil. For example, power conversion for wirelessly charging devices including mobile phones, cordless phones, iPods, MP3 players, headsets, and so on, within the system will be described in this specification. Generally, the basic principle of the wireless power transfer technique includes, for example, all of a method of transferring power by using magnetic coupling, a method of transferring power by using radio frequency (RF), a method of transferring power by using microwaves, and a method of transferring power by using ultrasound (or ultrasonic waves).

Figure 1:
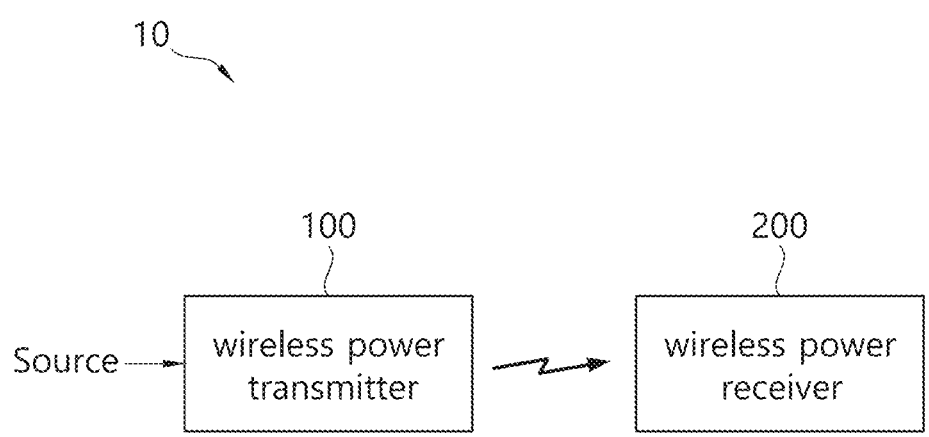
FIG. 1 is a block diagram of a wireless power system (10) according to an exemplary embodiment of the present disclosure.

FIG. 1 is a block diagram of a wireless power system (10) according to an exemplary embodiment of the present disclosure.

Referring to FIG. 1, the wireless power system (10) include a wireless power transmitter (100) and a wireless power receiver (200).

The wireless power transmitter (100) is supplied with power from an external power source (S) and generates a magnetic field. The wireless power receiver (200) generates electric currents by using the generated magnetic field, thereby being capable of wirelessly receiving power.

Additionally, in the wireless power system (10), the wireless power transmitter (100) and the wireless power receiver (200) may transceive (transmit and/or receive) diverse information that is required for the wireless power transfer. Herein, communication between the wireless power transmitter (100) and the wireless power receiver (200) may be performed (or established) in accordance with any one of an in-band communication, which uses a magnetic field that is used for the wireless power transfer (or transmission), and an out-band communication, which uses a separate communication carrier. Out-band communication may also be referred to as out-of-band communication. Hereinafter, out-band communication will be largely described. Examples of out-band communication may include NFC, Bluetooth, Bluetooth low energy (BLE), and the like.

Herein, the wireless power transmitter (100) may be provided as a fixed type or a mobile (or portable) type. Examples of the fixed transmitter type may include an embedded type, which is embedded in in-door ceilings or wall surfaces or embedded in furniture, such as tables, an implanted type, which is installed in out-door parking lots, bus stops, subway stations, and so on, or being installed in means of transportation, such as vehicles or trains. The mobile (or portable) type wireless power transmitter (100) may be implemented as a part of another device, such as a mobile device having a portable size or weight or a cover of a laptop computer, and so on.

Additionally, the wireless power receiver (200) should be interpreted as a comprehensive concept including diverse home appliances and devices that are operated by being wirelessly supplied with power instead of diverse electronic devices being equipped with a battery and a power cable. Typical examples of the wireless power receiver (200) may include portable terminals, cellular phones, smartphones, personal digital assistants (PDAs), portable media players (PDPs), Wibro terminals, tablet PCs, phablet, laptop computers, digital cameras, navigation terminals, television, electronic vehicles (EVs), and so on.

Figure 2:
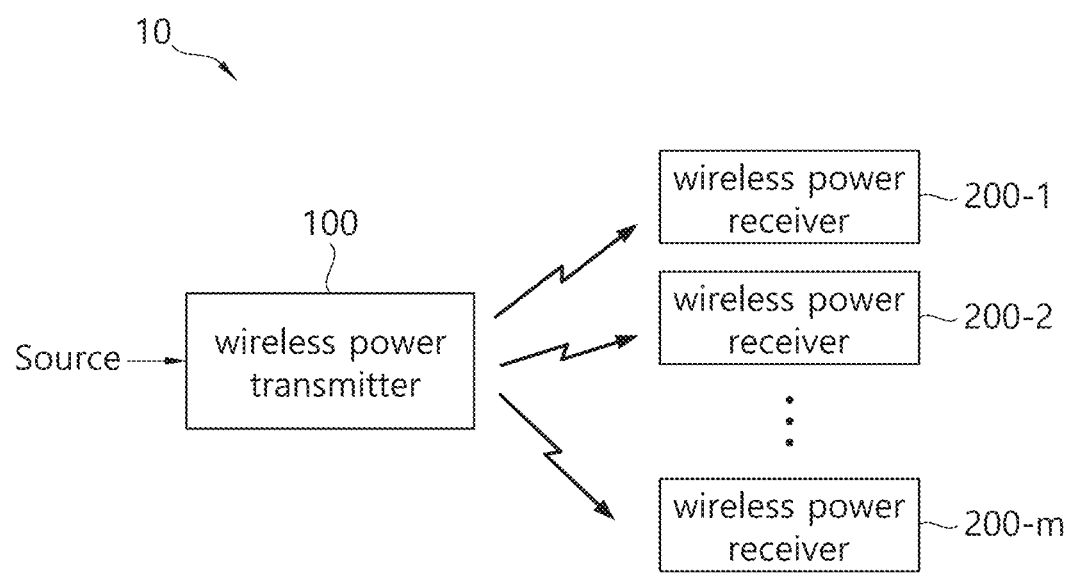
FIG. 2 is a block diagram of a wireless power system (10) according to another exemplary embodiment of the present disclosure.

FIG. 2 is a block diagram of a wireless power system (10) according to another exemplary embodiment of the present disclosure.

Referring to FIG. 2, in the wireless power system (10), one wireless power receiver (200) or a plurality of wireless power receivers may exist. Although it is shown in FIG. 1 that the wireless power transmitter (100) and the wireless power receiver (200) send and receive power to and from one another in a one-to-one correspondence (or relationship), as shown in FIG. 2, it is also possible for one wireless power transmitter (100) to simultaneously transfer power to multiple wireless power receivers (200-1, 200-2, . . . , 200-M). Most particularly, in case the wireless power transfer (or transmission) is performed by using a magnetic resonance method, one wireless power transmitter (100) may transfer power to multiple wireless power receivers (200-1, 200-2, . . . , 200-M) by using a synchronized transport (or transfer) method or a time-division transport (or transfer) method.

Additionally, although it is shown in FIG. 1 that the wireless power transmitter (100) directly transfers (or transmits) power to the wireless power receiver (200), the wireless power system (10) may also be equipped with a separate wireless power transceiver, such as a relay or repeater, for increasing a wireless power transport distance between the wireless power transmitter (100) and the wireless power receiver (200). In this case, power is delivered to the wireless power transceiver from the wireless power transmitter (100), and, then, the wireless power transceiver may transfer the received power to the wireless power receiver (200).

Hereinafter, the terms wireless power receiver, power receiver, and receiver, which are mentioned in this specification, will refer to the wireless power receiver (200). Also, the terms wireless power transmitter, power transmitter, and transmitter, which are mentioned in this specification, will refer to the wireless power transmitter (100).

Figure 3A:
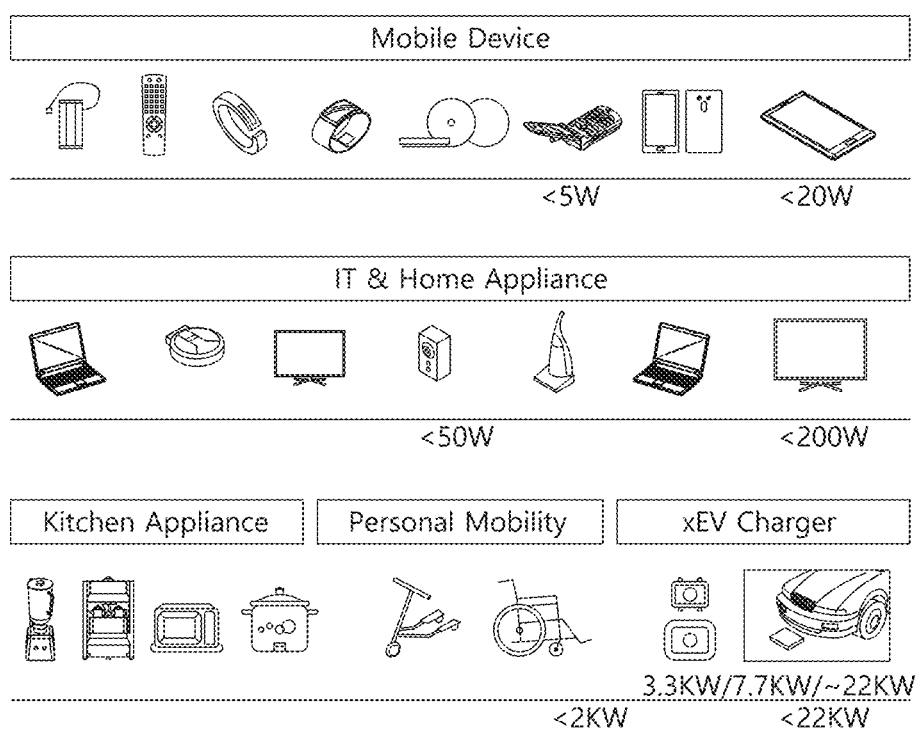
FIG. 3a shows an exemplary embodiment of diverse electronic devices adopting a wireless power transfer system.

FIG. 3a shows an exemplary embodiment of diverse electronic devices adopting a wireless power transfer system.

As shown in FIG. 3a, the electronic devices included in the wireless power transfer system are sorted in accordance with the amount of transmitted power and the amount of received power. Referring to FIG. 3, wearable devices, such as smart watches, smart glasses, head mounted displays (HMDs), smart rings, and so on, and mobile electronic devices (or portable electronic devices), such as earphones, remote controllers, smartphones, PDAs, tablet PCs, and so on, may adopt a low-power (approximately 5 W or less or approximately 20 W or less) wireless charging method.

Small-sized/Mid-sized electronic devices, such as laptop computers, robot vacuum cleaners, TV receivers, audio devices, vacuum cleaners, monitors, and so on, may adopt a mid-power (approximately 50 W or less or approximately 200 W or less) wireless charging method. Kitchen appliances, such as mixers, microwave ovens, electric rice cookers, and so on, and personal transportation devices (or other electric devices or means of transportation), such as powered wheelchairs, powered kick scooters, powered bicycles, electric cars, and so on may adopt a high-power (approximately 2 kW or less or approximately 22 kW or less) wireless charging method.

The electric devices or means of transportation, which are described above (or shown in FIG. 1) may each include a wireless power receiver, which will hereinafter be described in detail. Therefore, the above-described electric devices or means of transportation may be charged (or recharged) by wirelessly receiving power from a wireless power transmitter.

Hereinafter, although the present disclosure will be described based on a mobile device adopting the wireless power charging method, this is merely exemplary. And, therefore, it shall be understood that the wireless charging method according to the present disclosure may be applied to diverse electronic devices.

A standard for the wireless power transfer (or transmission) includes a wireless power consortium (WPC), an air fuel alliance (AFA), and a power matters alliance (PMA).

The WPC standard defines a baseline power profile (BPP) and an extended power profile (EPP). The BPP is related to a wireless power transmitter and a wireless power receiver supporting a power transfer of 5 W, and the EPP is related to a wireless power transmitter and a wireless power receiver supporting the transfer of a power range greater than 5 W and less than 30 W.

Diverse wireless power transmitters and wireless power receivers each using a different power level may be covered by each standard and may be sorted by different power classes or categories.

For example, the WPC may categorize (or sort) the wireless power transmitters and the wireless power receivers as PC-1, PC0, PC1, and PC2, and the WPC may provide a standard document (or specification) for each power class (PC). The PC-1 standard relates to wireless power transmitters and receivers providing a guaranteed power of less than 5 W. The application of PC-1 includes wearable devices, such as smart watches.

The PC0 standard relates to wireless power transmitters and receivers providing a guaranteed power of 5 W. The PC0 standard includes an EPP having a guaranteed power ranges that extends to 30 W. Although in-band (IB) communication corresponds to a mandatory communication protocol of PC0, out-of-band (OB) communication that is used as an optional backup channel may also be used for PC0. The wireless power receiver may be identified by setting up an OB flag, which indicates whether or not the OB is supported, within a configuration packet. A wireless power transmitter supporting the OB may enter an OB handover phase by transmitting a bit-pattern for an OB handover as a response to the configuration packet. The response to the configuration packet may correspond to an NAK, an ND, or an 8-bit pattern that is newly defined. The application of the PC0 includes smartphones.

The PC1 standard relates to wireless power transmitters and receivers providing a guaranteed power ranging from 30 W to 150 W. OB corresponds to a mandatory communication channel for PC1, and IB is used for initialization and link establishment to OB. The wireless power transmitter may enter an OB handover phase by transmitting a bit-pattern for an OB handover as a response to the configuration packet. The application of the PC1 includes laptop computers or power tools.

The PC2 standard relates to wireless power transmitters and receivers providing a guaranteed power ranging from 200 W to 2 kW, and its application includes kitchen appliances.

As described above, the PCs may be differentiated in accordance with the respective power levels. And, information on whether or not the compatibility between the same PCs is supported may be optional or mandatory. Herein, the compatibility between the same PCs indicates that power transfer/reception between the same PCs is possible. For example, in case a wireless power transmitter corresponding to PC x is capable of performing charging of a wireless power receiver having the same PC x, it may be understood that compatibility is maintained between the same PCs. Similarly, compatibility between different PCs may also be supported. Herein, the compatibility between different PCs indicates that power transfer/reception between different PCs is also possible. For example, in case a wireless power transmitter corresponding to PC x is capable of performing charging of a wireless power receiver having PC y, it may be understood that compatibility is maintained between the different PCs.

The support of compatibility between PCs corresponds to an extremely important issue in the aspect of user experience and establishment of infrastructure. Herein, however, diverse problems, which will be described below, exist in maintaining the compatibility between PCs.

In case of the compatibility between the same PCs, for example, in case of a wireless power receiver using a lap-top charging method, wherein stable charging is possible only when power is continuously transferred, even if its respective wireless power transmitter has the same PC, it may be difficult for the corresponding wireless power receiver to stably receive power from a wireless power transmitter of the power tool method, which transfers power non-continuously. Additionally, in case of the compatibility between different PCs, for example, in case a wireless power transmitter having a minimum guaranteed power of 200 W transfers power to a wireless power receiver having a maximum guaranteed power of 5 W, the corresponding wireless power receiver may be damaged due to an overvoltage. As a result, it may be inappropriate (or difficult) to use the PS as an index/reference standard representing/indicating the compatibility.

Wireless power transmitters and receivers may provide a very convenient user experience and interface (UX/UI). That is, a smart wireless charging service may be provided, and the smart wireless charging service may be implemented based on a UX/UI of a smartphone including a wireless power transmitter. For these applications, an interface between a processor of a smartphone and a wireless charging receiver allows for "drop and play" two-way communication between the wireless power transmitter and the wireless power receiver.

Hereinafter, 'profiles' will be newly defined based on indexes/reference standards representing/indicating the compatibility. More specifically, it may be understood that by maintaining compatibility between wireless power transmitters and receivers having the same 'profile', stable power transfer/reception may be performed, and that power transfer/reception between wireless power transmitters and receivers having different 'profiles' cannot be performed. The 'profiles' may be defined in accordance with whether or not compatibility is possible and/or the application regardless of (or independent from) the power class.

For example, the profile may be sorted into 3 different categories, such as i) Mobile, ii) Power tool and iii) Kitchen.

For another example, the profile may be sorted into 4 different categories, such as i) Mobile, ii) Power tool, iii) Kitchen, and iv) Wearable.

In case of the 'Mobile' profile, the PC may be defined as PC0 and/or PC1, the communication protocol/method may be defined as IB and OB communication, and the operation frequency may be defined as 87 to 205 kHz, and smartphones, laptop computers, and so on, may exist as the exemplary application.

In case of the 'Power tool' profile, the PC may be defined as PC1, the communication protocol/method may be defined as IB communication, and the operation frequency may be defined as 87 to 145 kHz, and power tools, and so on, may exist as the exemplary application.

In case of the 'Kitchen' profile, the PC may be defined as PC2, the communication protocol/method may be defined as NFC-based communication, and the operation frequency may be defined as less than 100 kHz, and kitchen/home appliances, and so on, may exist as the exemplary application.

In the case of power tools and kitchen profiles, NFC communication may be used between the wireless power transmitter and the wireless power receiver. The wireless power transmitter and the wireless power receiver may confirm that they are NFC devices with each other by exchanging WPC NFC data exchange profile format (NDEF).

FIG. 3b shows an example of a WPC NDEF in a wireless power transfer system.

Referring to FIG. 3b, the WPC NDEF may include, for example, an application profile field (e.g., 1B), a version field (e.g., 1B), and profile specific data (e.g., 1B). The application profile field indicates whether the corresponding device is i) mobile and computing, ii) power tool, and iii) kitchen, and an upper nibble in the version field indicates a major version and a lower nibble indicates a minor version. In addition, profile-specific data defines content for the kitchen.

In case of the 'Wearable' profile, the PC may be defined as PC-1, the communication protocol/method may be defined as IB communication, and the operation frequency may be defined as 87 to 205 kHz, and wearable devices that are worn by the users, and so on, may exist as the exemplary application.

It may be mandatory to maintain compatibility between the same profiles, and it may be optional to maintain compatibility between different profiles.

The above-described profiles (Mobile profile, Power tool profile, Kitchen profile, and Wearable profile) may be generalized and expressed as first to nth profile, and a new profile may be added/replaced in accordance with the WPC standard and the exemplary embodiment.

In case the profile is defined as described above, the wireless power transmitter may optionally perform power transfer only to the wireless power receiving corresponding to the same profile as the wireless power transmitter, thereby being capable of performing a more stable power transfer. Additionally, since the load (or burden) of the wireless power transmitter may be reduced and power transfer is not attempted to a wireless power receiver for which compatibility is not possible, the risk of damage in the wireless power receiver may be reduced.

PC1 of the 'Mobile' profile may be defined by being derived from an optional extension, such as OB, based on PC0. And, the 'Power tool' profile may be defined as a simply modified version of the PC1 'Mobile' profile. Additionally, up until now, although the profiles have been defined for the purpose of maintaining compatibility between the same profiles, in the future, the technology may be evolved to a level of maintaining compatibility between different profiles. The wireless power transmitter or the wireless power receiver may notify (or announce) its profile to its counterpart by using diverse methods.

In the AFA standard, the wireless power transmitter is referred to as a power transmitting unit (PTU), and the wireless power receiver is referred to as a power receiving unit (PRU). And, the PTU is categorized to multiple classes, as shown in Table 1, and the PRU is categorized to multiple classes, as shown in Table 2.

TABLE 1

| PTU | $P_{TX\_IN\_MAX}$ | Minimum category support requirement | Minimum value for a maximum number of supported devices |
|---|---|---|---|
| Class 1 | 2 W | 1x Category 1 | 1x Category 1 |
| Class 2 | 10 W | 1x Category 3 | 2x Category 2 |
| Class 3 | 16 W | 1x Category 4 | 2x Category 3 |
| Class 4 | 33 W | 1x Category 5 | 3x Category 3 |
| Class 5 | 50 W | 1x Category 6 | 4x Category 3 |
| Class 6 | 70 W | 1x Category 7 | 5x Category 3 |

TABLE 2

| PRU | $P_{RX\_OUT\_MAX}$ | Exemplary application |
|---|---|---|
| Category 1 | TBD | Bluetooth headset |
| Category 2 | 3.5 W | Feature phone |
| Category 3 | 6.5 W | Smartphone |
| Category 4 | 13 W | Tablet PC, Phablet |
| Category 5 | 25 W | Small form factor laptop |

TABLE 2-continued

| PRU | $P_{RX\_OUT\_MAX}$ | Exemplary application |
|---|---|---|
| Category 6 | 37.5 W | General laptop |
| Category 7 | 50 W | Home appliance |

As shown in Table 1, a maximum output power capability of Class n PTU may be equal to or greater than the $P_{TX\_IN\_MAX}$ of the corresponding class. The PRU cannot draw a power that is higher than the power level specified in the corresponding category.

Figure 4:
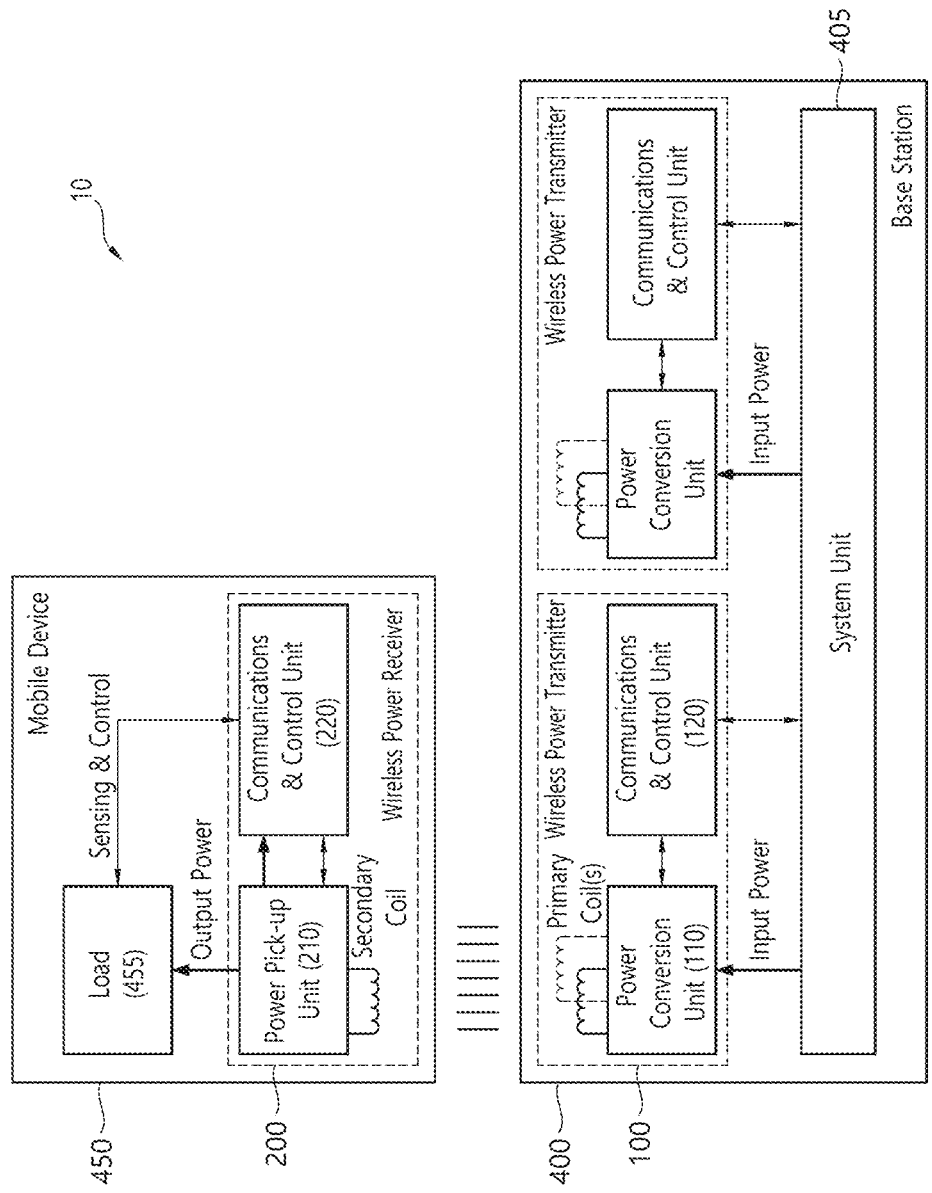
FIG. 4 is a block diagram of a wireless power transfer system according to another exemplary embodiment of the present disclosure.

FIG. 4 is a block diagram of a wireless power transfer system according to another exemplary embodiment of the present disclosure.

Referring to FIG. 4, the wireless power transfer system (10) includes a mobile device (450), which wirelessly receives power, and a base station (400), which wirelessly transmits power.

As a device providing induction power or resonance power, the base station (400) may include at least one of a wireless power transmitter (100) and a system unit (405). The wireless power transmitter (100) may transmit induction power or resonance power and may control the transmission. The wireless power transmitter (100) may include a power conversion unit (110) converting electric energy to a power signal by generating a magnetic field through a primary coil (or primary coils), and a communications & control unit (120) controlling the communication and power transfer between the wireless power receiver (200) in order to transfer power at an appropriate (or suitable) level. The system unit (405) may perform input power provisioning, controlling of multiple wireless power transmitters, and other operation controls of the base station (400), such as user interface control.

The primary coil may generate an electromagnetic field by using an alternating current power (or voltage or current). The primary coil is supplied with an alternating current power (or voltage or current) of a specific frequency, which is being outputted from the power conversion unit (110). And, accordingly, the primary coil may generate a magnetic field of the specific frequency. The magnetic field may be generated in a non-radial shape or a radial shape. And, the wireless power receiver (200) receives the generated magnetic field and then generates an electric current. In other words, the primary coil wirelessly transmits power.

In the magnetic induction method, a primary coil and a secondary coil may have randomly appropriate shapes. For example, the primary coil and the secondary coil may correspond to copper wire being wound around a high-permeability formation, such as ferrite or a non-crystalline metal. The primary coil may also be referred to as a transmitting coil, a primary core, a primary winding, a primary loop antenna, and so on. Meanwhile, the secondary coil may also be referred to as a receiving coil, a secondary core, a secondary winding, a secondary loop antenna, a pickup antenna, and so on.

In case of using the magnetic resonance method, the primary coil and the secondary coil may each be provided in the form of a primary resonance antenna and a secondary resonance antenna. The resonance antenna may have a resonance structure including a coil and a capacitor. At this point, the resonance frequency of the resonance antenna may be determined by the inductance of the coil and a capacitance of the capacitor. Herein, the coil may be formed to have a loop shape. And, a core may be placed inside the loop. The core may include a physical core, such as a ferrite core, or an air core.

The energy transmission (or transfer) between the primary resonance antenna and the second resonance antenna may be performed by a resonance phenomenon occurring in the magnetic field. When a near field corresponding to a resonance frequency occurs in a resonance antenna, and in case another resonance antenna exists near the corresponding resonance antenna, the resonance phenomenon refers to a highly efficient energy transfer occurring between the two resonance antennas that are coupled with one another. When a magnetic field corresponding to the resonance frequency is generated between the primary resonance antenna and the secondary resonance antenna, the primary resonance antenna and the secondary resonance antenna resonate with one another. And, accordingly, in a general case, the magnetic field is focused toward the second resonance antenna at a higher efficiency as compared to a case where the magnetic field that is generated from the primary antenna is radiated to a free space. And, therefore, energy may be transferred to the second resonance antenna from the first resonance antenna at a high efficiency. The magnetic induction method may be implemented similarly to the magnetic resonance method. However, in this case, the frequency of the magnetic field is not required to be a resonance frequency. Nevertheless, in the magnetic induction method, the loops configuring the primary coil and the secondary coil are required to match one another, and the distance between the loops should be very close-ranged.

Although it is not shown in the drawing, the wireless power transmitter (100) may further include a communication antenna. The communication antenna may transmit and/or receive a communication signal by using a communication carrier apart from the magnetic field communication. For example, the communication antenna may transmit and/or receive communication signals corresponding to Wi-Fi, Bluetooth, Bluetooth LE, ZigBee, NFC, and so on.

The communications & control unit (120) may transmit and/or receive information to and from the wireless power receiver (200). The communications & control unit (120) may include at least one of an IB communication module and an OB communication module.

The IB communication module may transmit and/or receive information by using a magnetic wave, which uses a specific frequency as its center frequency. For example, the communications & control unit (120) may perform in-band (IB) communication by transmitting communication information on the operating frequency of wireless power transfer through the primary coil or by receiving communication information on the operating frequency through the primary coil. At this point, the communications & control unit (120) may load information in the magnetic wave or may interpret the information that is carried by the magnetic wave by using a modulation scheme, such as binary phase shift keying (BPSK), Frequency Shift Keying (FSK) or amplitude shift keying (ASK), and so on, or a coding scheme, such as Manchester coding or non-return-to-zero level (NZR-L) coding, and so on. By using the above-described IB communication, the communications & control unit (120) may transmit and/or receive information to distances of up to several meters at a data transmission rate of several kbps.

The OB communication module may also perform out-of-band communication through a communication antenna. For example, the communications & control unit (120) may be provided to a near field communication module. Examples of the near field communication module may include communication modules, such as Wi-Fi, Bluetooth, Bluetooth LE, ZigBee, NFC, and so on.

The communications & control unit (120) may control the overall operations of the wireless power transmitter (100). The communications & control unit (120) may perform calculation and processing of diverse information and may also control each configuration element of the wireless power transmitter (100).

The communications & control unit (120) may be implemented in a computer or a similar device as hardware, software, or a combination of the same. When implemented in the form of hardware, the communications & control unit (120) may be provided as an electronic circuit performing control functions by processing electrical signals. And, when implemented in the form of software, the communications & control unit (120) may be provided as a program that operates the communications & control unit (120).

By controlling the operating point, the communications & control unit (120) may control the transmitted power. The operating point that is being controlled may correspond to a combination of a frequency (or phase), a duty cycle, a duty ratio, and a voltage amplitude. The communications & control unit (120) may control the transmitted power by adjusting any one of the frequency (or phase), the duty cycle, the duty ratio, and the voltage amplitude. Additionally, the wireless power transmitter (100) may supply a consistent level of power, and the wireless power receiver (200) may control the level of received power by controlling the resonance frequency.

The mobile device (450) includes a wireless power receiver (200) receiving wireless power through a secondary coil, and a load (455) receiving and storing the power that is received by the wireless power receiver (200) and supplying the received power to the device.

The wireless power receiver (200) may include a power pick-up unit (210) and a communications & control unit (220). The power pick-up unit (210) may receive wireless power through the secondary coil and may convert the received wireless power to electric energy. The power pick-up unit (210) rectifies the alternating current (AC) signal, which is received through the secondary coil, and converts the rectified signal to a direct current (DC) signal. The communications & control unit (220) may control the transmission and reception of the wireless power (transfer and reception of power).

The secondary coil may receive wireless power that is being transmitted from the wireless power transmitter (100). The secondary coil may receive power by using the magnetic field that is generated in the primary coil. Herein, in case the specific frequency corresponds a resonance frequency, magnetic resonance may occur between the primary coil and the secondary coil, thereby allowing power to be transferred with greater efficiency.

Although it is not shown in FIG. 4, the communications & control unit (220) may further include a communication antenna. The communication antenna may transmit and/or receive a communication signal by using a communication carrier apart from the magnetic field communication. For example, the communication antenna may transmit and/or receive communication signals corresponding to Wi-Fi, Bluetooth, Bluetooth LE, ZigBee, NFC, and so on.

The communications & control unit (220) may transmit and/or receive information to and from the wireless power transmitter (100). The communications & control unit (220) may include at least one of an IB communication module and an OB communication module.

The IB communication module may transmit and/or receive information by using a magnetic wave, which uses a specific frequency as its center frequency. For example, the communications & control unit (220) may perform IB communication by loading information in the magnetic wave and by transmitting the information through the secondary coil or by receiving a magnetic wave carrying information through the secondary coil. At this point, the communications & control unit (120) may load information in the magnetic wave or may interpret the information that is carried by the magnetic wave by using a modulation scheme, such as binary phase shift keying (BPSK), Frequency Shift Keying (FSK) or amplitude shift keying (ASK), and so on, or a coding scheme, such as Manchester coding or non-return-to-zero level (NZR-L) coding, and so on. By using the above-described IB communication, the communications & control unit (220) may transmit and/or receive information to distances of up to several meters at a data transmission rate of several kbps.

The OB communication module may also perform out-of-band communication through a communication antenna. For example, the communications & control unit (220) may be provided to a near field communication module.

Examples of the near field communication module may include communication modules, such as Wi-Fi, Bluetooth, Bluetooth LE, ZigBee, NFC, and so on.

The communications & control unit (220) may control the overall operations of the wireless power receiver (200). The communications & control unit (220) may perform calculation and processing of diverse information and may also control each configuration element of the wireless power receiver (200).

The communications & control unit (220) may be implemented in a computer or a similar device as hardware, software, or a combination of the same. When implemented in the form of hardware, the communications & control unit (220) may be provided as an electronic circuit performing control functions by processing electrical signals. And, when implemented in the form of software, the communications & control unit (220) may be provided as a program that operates the communications & control unit (220).

Hereinafter, the coil or coil unit includes a coil and at least one device being approximate to the coil, and the coil or coil unit may also be referred to as a coil assembly, a coil cell, or a cell.

Figure 5:
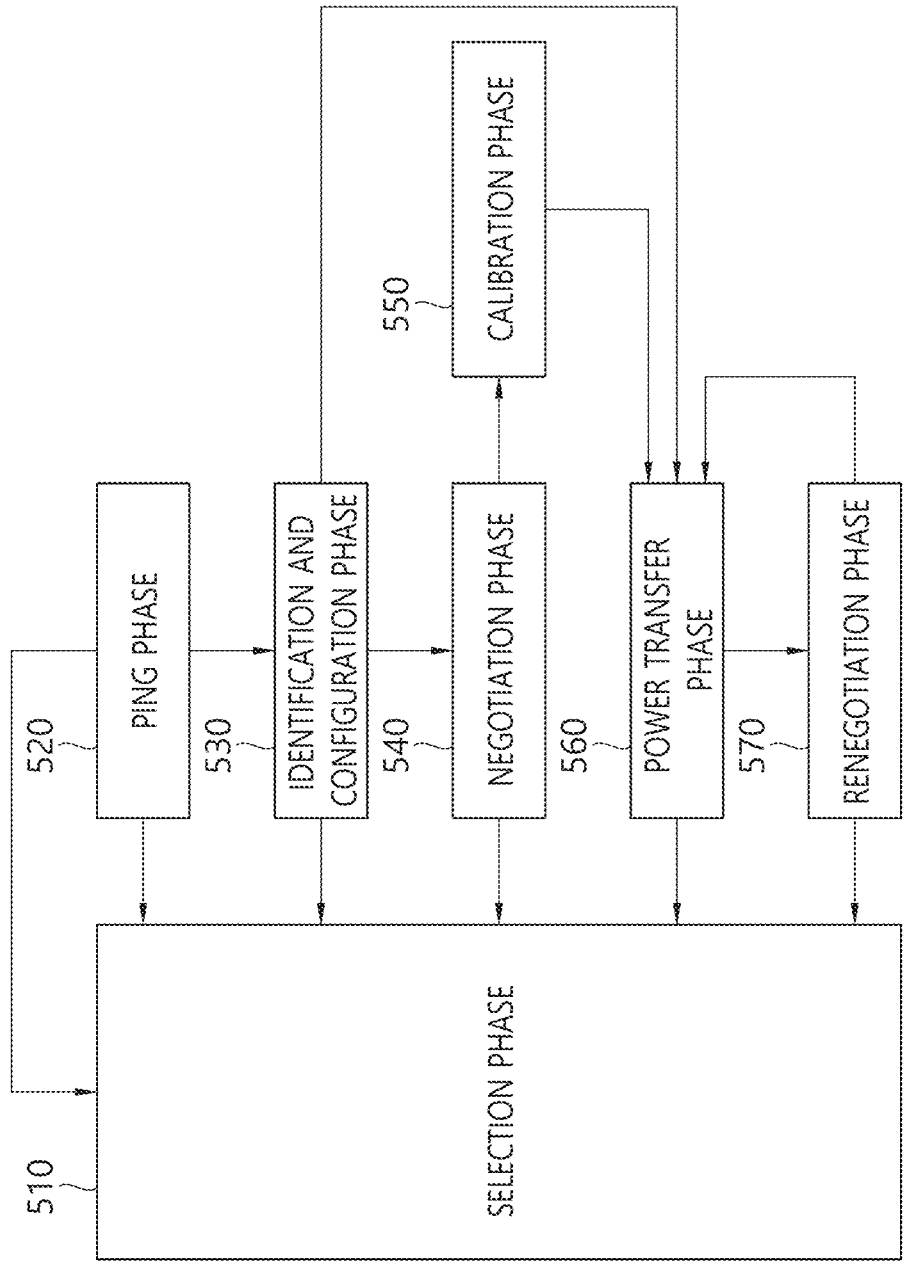
FIG. 5 is a state transition diagram for describing a wireless power transfer procedure.

FIG. 5 is a state transition diagram for describing a wireless power transfer procedure.

Referring to FIG. 5, the power transfer (or transfer) from the wireless power transmitter to the wireless power receiver according to an exemplary embodiment of the present disclosure may be broadly divided into a selection phase (510), a ping phase (520), an identification and configuration phase (530), a negotiation phase (540), a calibration phase (550), a power transfer phase (560), and a renegotiation phase (570).

If a specific error or a specific event is detected when the power transfer is initiated or while maintaining the power transfer, the selection phase (510) may include a shifting phase (or step)—reference numerals S502, S504, S508, S510, and S512. Herein, the specific error or specific event will be specified in the following description. Additionally, during the selection phase (510), the wireless power transmitter may monitor whether or not an object exists on an interface surface. If the wireless power transmitter detects that an object is placed on the interface surface, the process step may be shifted to the ping phase (520). During the selection phase (510), the wireless power transmitter may transmit an analog ping having a power signal (or a pulse) corresponding to an extremely short duration, and may detect whether or not an object exists within an active area of the interface surface based on a current change in the transmitting coil or the primary coil.

In case an object is sensed (or detected) in the selection phase (510), the wireless power transmitter may measure a quality factor of a wireless power resonance circuit (e.g., power transfer coil and/or resonance capacitor). According to the exemplary embodiment of the present disclosure, during the selection phase (510), the wireless power transmitter may measure the quality factor in order to determine whether or not a foreign object exists in the charging area along with the wireless power receiver. In the coil that is provided in the wireless power transmitter, inductance and/or components of the series resistance may be reduced due to a change in the environment, and, due to such decrease, a value of the quality factor may also be decreased. In order to determine the presence or absence of a foreign object by using the measured quality factor value, the wireless power transmitter may receive from the wireless power receiver a reference quality factor value, which is measured in advance in a state where no foreign object is placed within the charging area. The wireless power transmitter may determine the presence or absence of a foreign object by comparing the measured quality factor value with the reference quality factor value, which is received during the negotiation phase (540). However, in case of a wireless power receiver having a low reference quality factor value—e.g., depending upon its type, purpose, characteristics, and so on, the wireless power receiver may have a low reference quality factor value—in case a foreign object exists, since the difference between the reference quality factor value and the measured quality factor value is small (or insignificant), a problem may occur in that the presence of the foreign object cannot be easily determined. Accordingly, in this case, other determination factors should be further considered, or the present or absence of a foreign object should be determined by using another method.

According to another exemplary embodiment of the present disclosure, in case an object is sensed (or detected) in the selection phase (510), in order to determine whether or not a foreign object exists in the charging area along with the wireless power receiver, the wireless power transmitter may measure the quality factor value within a specific frequency area (e.g., operation frequency area). In the coil that is provided in the wireless power transmitter, inductance and/or components of the series resistance may be reduced due to a change in the environment, and, due to such decrease, the resonance frequency of the coil of the wireless power transmitter may be changed (or shifted). More specifically, a quality factor peak frequency that corresponds to a frequency in which a maximum quality factor value is measured within the operation frequency band may be moved (or shifted).

In the ping phase (520), if the wireless power transmitter detects the presence of an object, the transmitter activates (or Wakes up) a receiver and transmits a digital ping for identifying whether or not the detected object corresponds to the wireless power receiver. During the ping phase (520), if the wireless power transmitter fails to receive a response signal for the digital ping—e.g., a signal intensity packet—from the receiver, the process may be shifted back to the selection phase (510). Additionally, in the ping phase (520), if the wireless power transmitter receives a signal indicating the completion of the power transfer—e.g., charging complete packet—from the receiver, the process may be shifted back to the selection phase (510).

If the ping phase (520) is completed, the wireless power transmitter may shift to the identification and configuration phase (530) for identifying the receiver and for collecting configuration and status information.

In the identification and configuration phase (530), if the wireless power transmitter receives an unwanted packet (i.e., unexpected packet), or if the wireless power transmitter fails to receive a packet during a predetermined period of time (i.e., out of time), or if a packet transmission error occurs (i.e., transmission error), or if a power transfer contract is not configured (i.e., no power transfer contract), the wireless power transmitter may shift to the selection phase (510).

The wireless power transmitter may confirm (or verify) whether or not its entry to the negotiation phase (540) is needed based on a Negotiation field value of the configuration packet, which is received during the identification and configuration phase (530). Based on the verified result, in case a negotiation is needed, the wireless power transmitter enters the negotiation phase (540) and may then perform a predetermined FOD detection procedure. Conversely, in case a negotiation is not needed, the wireless power transmitter may immediately enter the power transfer phase (560).

In the negotiation phase (540), the wireless power transmitter may receive a Foreign Object Detection (FOD) status packet that includes a reference quality factor value. Or, the wireless power transmitter may receive an FOD status packet that includes a reference peak frequency value. Alternatively, the wireless power transmitter may receive a status packet that includes a reference quality factor value and a reference peak frequency value. At this point, the wireless power transmitter may determine a quality coefficient threshold value for FO detection based on the reference quality factor value. The wireless power transmitter may determine a peak frequency threshold value for FO detection based on the reference peak frequency value.

The wireless power transmitter may detect the presence or absence of an FO in the charging area by using the determined quality coefficient threshold value for FO detection and the currently measured quality factor value (i.e., the quality factor value that was measured before the ping phase), and, then, the wireless power transmitter may control the transmitted power in accordance with the FO detection result. For example, in case the FO is detected, the power transfer may be stopped. However, the present disclosure will not be limited only to this.

The wireless power transmitter may detect the presence or absence of an FO in the charging area by using the determined peak frequency threshold value for FO detection and the currently measured peak frequency value (i.e., the peak frequency value that was measured before the ping phase), and, then, the wireless power transmitter may control the transmitted power in accordance with the FO detection result. For example, in case the FO is detected, the power transfer may be stopped. However, the present disclosure will not be limited only to this.

In case the FO is detected, the wireless power transmitter may return to the selection phase (510). Conversely, in case the FO is not detected, the wireless power transmitter may proceed to the calibration phase (550) and may, then, enter the power transfer phase (560). More specifically, in case the FO is not detected, the wireless power transmitter may determine the intensity of the received power that is received by the receiving end during the calibration phase (550) and may measure power loss in the receiving end and the transmitting end in order to determine the intensity of the power that is transmitted from the transmitting end. In other words, during the calibration phase (550), the wireless power transmitter may estimate the power loss based on a difference between the transmitted power of the transmitting end and the received power of the receiving end. The wireless power transmitter according to the exemplary embodiment of the present disclosure may calibrate the threshold value for the FOD detection by applying the estimated power loss.

In the power transfer phase (560), in case the wireless power transmitter receives an unwanted packet (i.e., unexpected packet), or in case the wireless power transmitter fails to receive a packet during a predetermined period of time (i.e., time-out), or in case a violation of a predetermined power transfer contract occurs (i.e., power transfer contract violation), or in case charging is completed, the wireless power transmitter may shift to the selection phase (510).

Additionally, in the power transfer phase (560), in case the wireless power transmitter is required to reconfigure the power transfer contract in accordance with a status change in the wireless power transmitter, the wireless power transmitter may shift to the renegotiation phase (570). At this point, if the renegotiation is successfully completed, the wireless power transmitter may return to the power transfer phase (560).

In this embodiment, the calibration step 550 and the power transfer phase 560 are divided into separate steps, but the calibration step 550 may be integrated into the power transfer phase 560. In this case, operations in the calibration step 550 may be performed in the power transfer phase 560.

The above-described power transfer contract may be configured based on the status and characteristic information of the wireless power transmitter and receiver. For example, the wireless power transmitter status information may include information on a maximum amount of transmittable power, information on a maximum number of receivers that may be accommodated, and so on. And, the receiver status information may include information on the required power, and so on.

Figure 6:
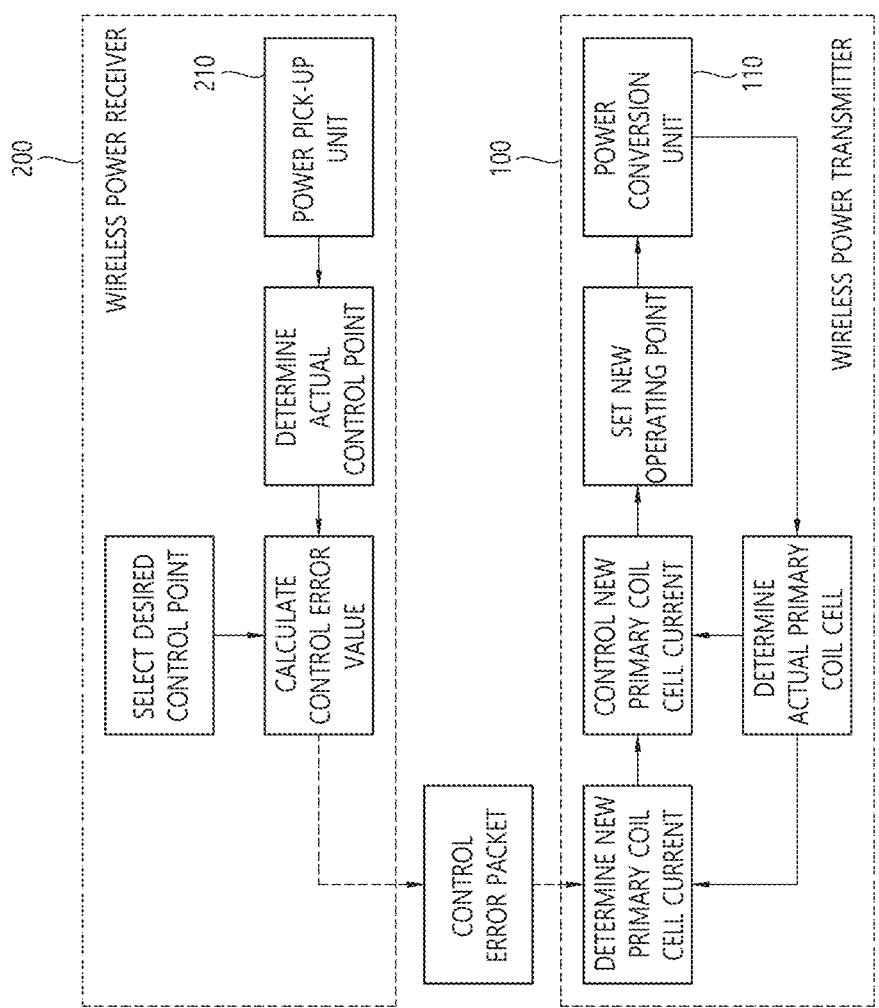
FIG. 6 shows a power control method according to an exemplary embodiment of the present disclosure.

FIG. 6 shows a power control method according to an exemplary embodiment of the present disclosure.

As shown in FIG. 6, in the power transfer phase (560), by alternating the power transfer and/or reception and communication, the wireless power transmitter (100) and the wireless power receiver (200) may control the amount (or size) of the power that is being transferred. The wireless power transmitter and the wireless power receiver operate at a specific control point. The control point indicates a combination of the voltage and the electric current that are provided from the output of the wireless power receiver, when the power transfer is performed.

More specifically, the wireless power receiver selects a desired control point, a desired output current/voltage, a temperature at a specific location of the mobile device, and so on, and additionally determines an actual control point at which the receiver is currently operating. The wireless power receiver calculates a control error value by using the desired control point and the actual control point, and, then, the wireless power receiver may transmit the calculated control error value to the wireless power transmitter as a control error packet.

Also, the wireless power transmitter may configure/control a new operating point—amplitude, frequency, and duty cycle—by using the received control error packet, so as to control the power transfer. Therefore, the control error packet may be transmitted/received at a constant time interval during the power transfer phase, and, according to the exemplary embodiment, in case the wireless power receiver attempts to reduce the electric current of the wireless power transmitter, the wireless power receiver may transmit the control error packet by setting the control error value to a negative number. And, in case the wireless power receiver intends to increase the electric current of the wireless power transmitter, the wireless power receiver transmit the control error packet by setting the control error value to a positive number. During the induction mode, by transmitting the control error packet to the wireless power transmitter as described above, the wireless power receiver may control the power transfer.

In the resonance mode, which will hereinafter be described in detail, the device may be operated by using a method that is different from the induction mode. In the resonance mode, one wireless power transmitter should be capable of serving a plurality of wireless power receivers at the same time. However, in case of controlling the power transfer just as in the induction mode, since the power that is being transferred is controlled by a communication that is established with one wireless power receiver, it may be difficult to control the power transfer of additional wireless power receivers. Therefore, in the resonance mode according to the present disclosure, a method of controlling the amount of power that is being received by having the wireless power transmitter commonly transfer (or transmit) the basic power and by having the wireless power receiver control its own resonance frequency. Nevertheless, even during the operation of the resonance mode, the method described above in FIG. 6 will not be completely excluded. And, additional control of the transmitted power may be performed by using the method of FIG. 6.

Figure 7:
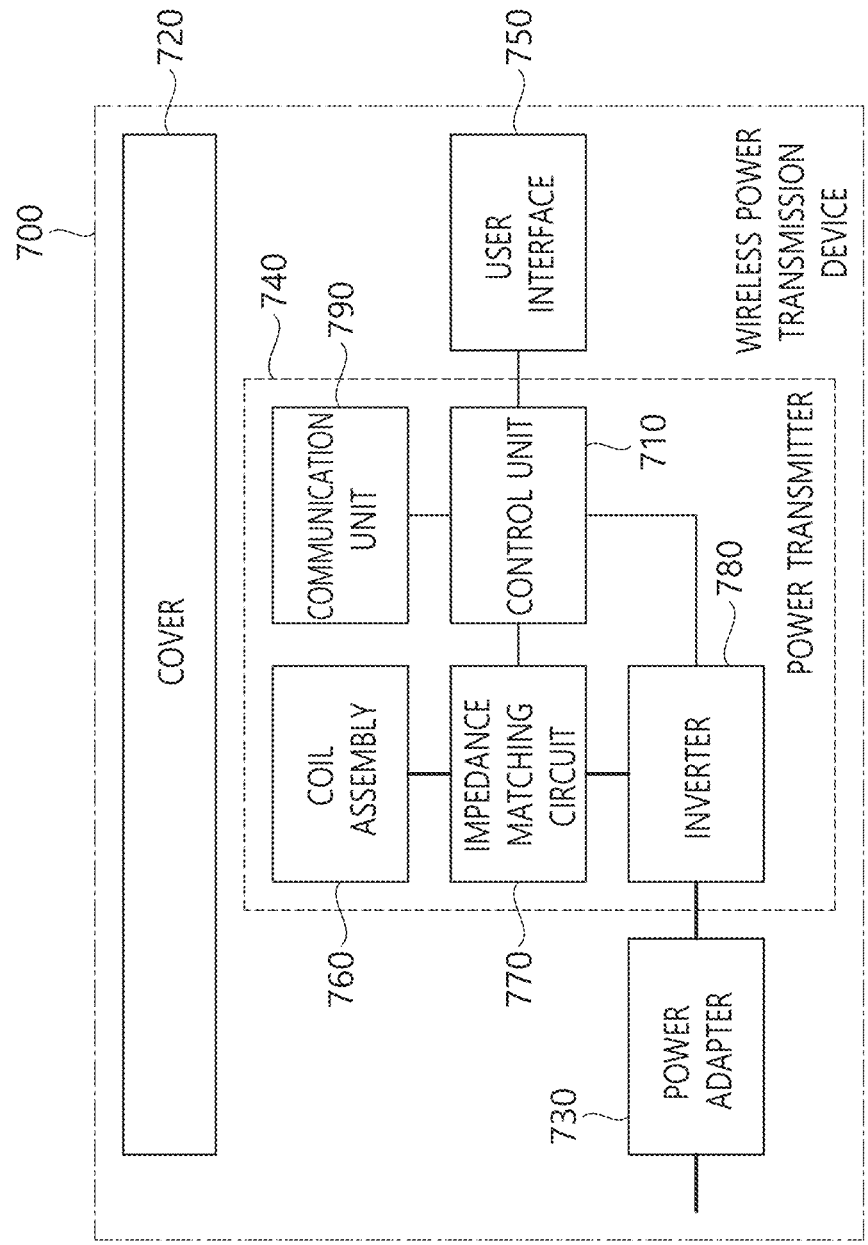
FIG. 7 is a block diagram of a wireless power transmitter according to another exemplary embodiment of the present disclosure.

FIG. 7 is a block diagram of a wireless power transmitter according to another exemplary embodiment of the present disclosure. This may belong to a wireless power transfer system that is being operated in the magnetic resonance mode or the shared mode. The shared mode may refer to a mode performing a several-for-one (or one-to-many) communication and charging between the wireless power transmitter and the wireless power receiver. The shared mode may be implemented as a magnetic induction method or a resonance method.

Referring to FIG. 7, the wireless power transmitter (700) may include at least one of a cover (720) covering a coil assembly, a power adapter (730) supplying power to the power transmitter (740), a power transmitter (740) transmitting wireless power, and a user interface (750) providing information related to power transfer processing and other related information. Most particularly, the user interface (750) may be optionally included or may be included as another user interface (750) of the wireless power transmitter (700).

The power transmitter (740) may include at least one of a coil assembly (760), an impedance matching circuit (770), an inverter (780), a communication unit (790), and a control unit (710).

The coil assembly (760) includes at least one primary coil generating a magnetic field. And, the coil assembly (760) may also be referred to as a coil cell.

The impedance matching circuit (770) may provide impedance matching between the inverter and the primary coil(s). The impedance matching circuit (770) may generate resonance from a suitable frequency that boosts the electric current of the primary coil(s). In a multi-coil power transmitter (740), the impedance matching circuit may additionally include a multiplex that routes signals from the inverter to a subset of the primary coils. The impedance matching circuit may also be referred to as a tank circuit.

The impedance matching circuit (770) may include a capacitor, an inductor, and a switching device that switches the connection between the capacitor and the inductor. The impedance matching may be performed by detecting a reflective wave of the wireless power that is being transferred (or transmitted) through the coil assembly (760) and by switching the switching device based on the detected reflective wave, thereby adjusting the connection status of the capacitor or the inductor or adjusting the capacitance of the capacitor or adjusting the inductance of the inductor. In some cases, the impedance matching may be carried out even though the impedance matching circuit (770) is omitted. This specification also includes an exemplary embodiment of the wireless power transmitter (700), wherein the impedance matching circuit (770) is omitted.

The inverter (780) may convert a DC input to an AC signal. The inverter (780) may be operated as a half-bridge inverter or a full-bridge inverter in order to generate a pulse wave and a duty cycle of an adjustable frequency. Additionally, the inverter may include a plurality of stages in order to adjust input voltage levels.

The communication unit (790) may perform communication with the power receiver. The power receiver performs load modulation in order to communicate requests and information corresponding to the power transmitter. Therefore, the power transmitter (740) may use the communication unit (790) so as to monitor the amplitude and/or phase of the electric current and/or voltage of the primary coil in order to demodulate the data being transmitted from the power receiver.

Additionally, the power transmitter (740) may control the output power to that the data may be transferred through the communication unit (790) by using a Frequency Shift Keying (FSK) method, and so on.

The control unit (710) may control communication and power transfer (or delivery) of the power transmitter (740). The control unit (710) may control the power transfer by adjusting the above-described operating point. The operating point may be determined by, for example, at least any one of the operation frequency, the duty cycle, and the input voltage.

The communication unit (790) and the control unit (710) may each be provided as a separate unit/device/chipset or may be collectively provided as one unit/device/chipset.

Figure 8:
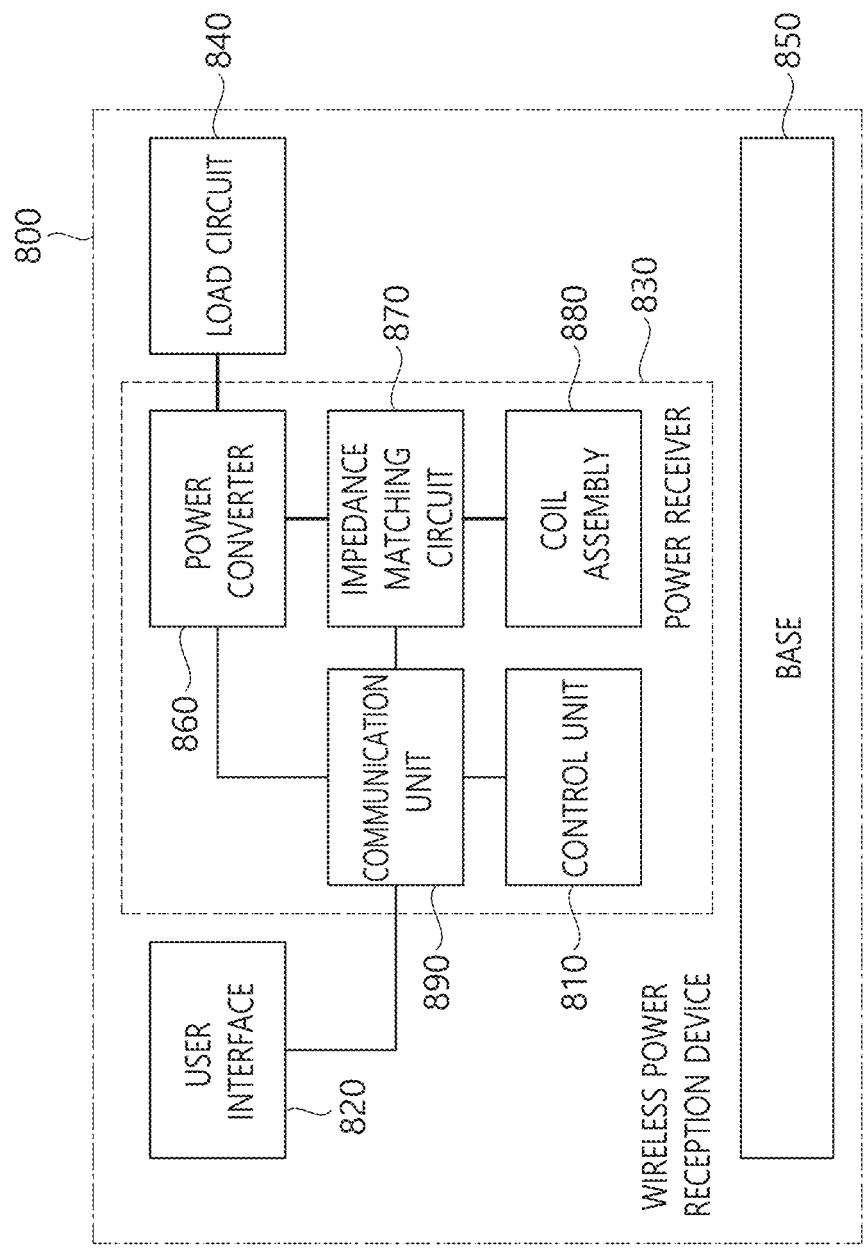
FIG. 8 shows a wireless power receiver according to another exemplary embodiment of the present disclosure.

FIG. 8 shows a wireless power receiver according to another exemplary embodiment of the present disclosure. This may belong to a wireless power transfer system that is being operated in the magnetic resonance mode or the shared mode.

Referring to FIG. 8, the wireless power receiver (800) may include at least one of a user interface (820) providing information related to power transfer processing and other related information, a power receiver (830) receiving wireless power, a load circuit (840), and a base (850) supporting and covering the coil assembly. Most particularly, the user interface (820) may be optionally included or may be included as another user interface (820) of the wireless power receiver (800).

The power receiver (830) may include at least one of a power converter (860), an impedance matching circuit (870), a coil assembly (880), a communication unit (890), and a control unit (810).

The power converter (860) may convert the AC power that is received from the secondary coil to a voltage and electric current that are suitable for the load circuit. According to an exemplary embodiment, the power converter (860) may include a rectifier. The rectifier may rectify the received wireless power and may convert the power from an alternating current (AC) to a direct current (DC). The rectifier may convert the alternating current to the direct current by using a diode or a transistor, and, then, the rectifier may smooth the converted current by using the capacitor and resistance. Herein, a full-wave rectifier, a half-wave rectifier, a voltage multiplier, and so on, that are implemented as a bridge circuit may be used as the rectifier. Additionally, the power converter may adapt a reflected impedance of the power receiver.

The impedance matching circuit (870) may provide impedance matching between a combination of the power converter (860) and the load circuit (840) and the secondary coil. According to an exemplary embodiment, the impedance matching circuit may generate a resonance of approximately 100 kHz, which may reinforce the power transfer. The impedance matching circuit (870) may include a capacitor, an inductor, and a switching device that switches the combination of the capacitor and the inductor. The impedance matching may be performed by controlling the switching device of the circuit that configured the impedance matching circuit (870) based on the voltage value, electric current value, power value, frequency value, and so on, of the wireless power that is being received. In some cases, the impedance matching may be carried out even though the impedance matching circuit (870) is omitted. This specification also includes an exemplary embodiment of the wireless power receiver (200), wherein the impedance matching circuit (870) is omitted.

The coil assembly (880) includes at least one secondary coil, and, optionally, the coil assembly (880) may further include an element shielding the metallic part of the receiver from the magnetic field.

The communication unit (890) may perform load modulation in order to communicate requests and other information to the power transmitter.

For this, the power receiver (830) may perform switching of the resistance or capacitor so as to change the reflected impedance.

The control unit (810) may control the received power. For this, the control unit (810) may determine/calculate a difference between an actual operating point and a target operating point of the power receiver (830). Thereafter, by performing a request for adjusting the reflected impedance of the power transmitter and/or for adjusting an operating point of the power transmitter, the difference between the actual operating point and the target operating point may be adjusted/reduced. In case of minimizing this difference, an optimal power reception may be performed.

The communication unit (890) and the control unit (810) may each be provided as a separate device/chipset or may be collectively provided as one device/chipset.

As described in FIG. 5 etc., the wireless power transmitter and the wireless power receiver go through a Ping Phase and a Configuration Phase to enter the Negotiation Phase, or may go through a ping phase, a configuration phase, and a negotiation phase to enter a power transfer phase and then to a re-negotiation phase.

Figure 9:
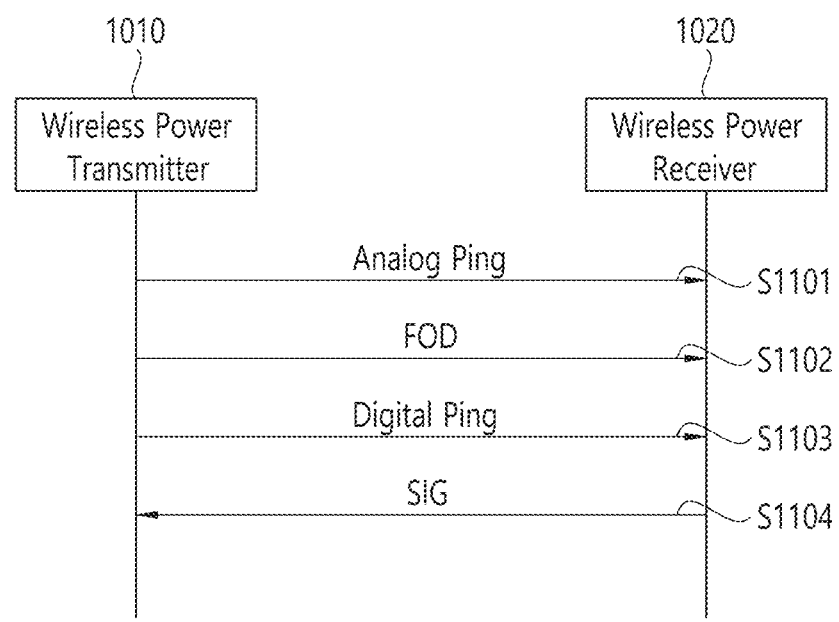
FIG. 9 is a flowchart schematically illustrating a protocol of a ping phase according to an embodiment.

FIG. 9 is a flowchart schematically illustrating a protocol of a ping phase according to an embodiment.

Referring to FIG. 9, in the ping phase, the wireless power transmitter 1010 checks whether an object exists in an operating volume by transmitting an analog ping (S1101). The wireless power transmitter 1010 may detect whether an object exists in the working space based on a change in current of a transmission coil or a primary coil.

If it is determined that an object exists in the operating volume by analog ping, the wireless power transmitter 1010 may perform foreign object detection (FOD) before power transmission to check whether a foreign object exists in the operating volume (S1102). The wireless power transmitter 1010 may perform an operation for protecting the NFC card and/or the RFID tag.

Thereafter, the wireless power transmitter 1010 identifies the wireless power receiver 1020 by transmitting a digital ping (S1103). The wireless power receiver 1020 recognizes the wireless power transmitter 1010 by receiving the digital ping.

The wireless power receiver 1020 that has received the digital ping transmits a signal strength data packet (SIG) to the wireless power transmitter 1010 (S1104).

The wireless power transmitter 1010 receiving the SIG from the wireless power receiver 1020 may identify that the wireless power receiver 1020 is located in the operating volume.

Figure 10:
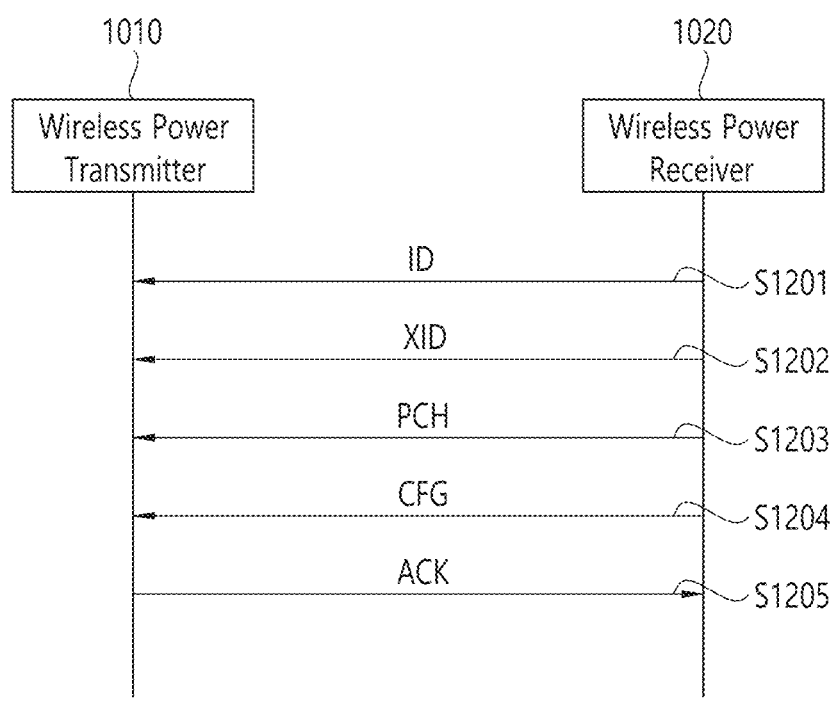
FIG. 10 is a flowchart schematically illustrating a protocol of a configuration phase according to an embodiment.

FIG. 10 is a flowchart schematically illustrating a protocol of a configuration phase according to an embodiment.

In the configuration phase (or identification and configuration phase), the wireless power receiver 1020 transmits its identification information to the wireless power transmitter 1010, the wireless power receiver 1020 and the wireless power transmitter 1010 may establish a baseline Power Transfer Contract.

Referring to FIG. 10, in the configuration phase, the wireless power receiver 1020 may transmit an identification data packet (ID) to the wireless power transmitter 1010 to identify itself (S1201). In addition, the wireless power receiver 1020 may transmit an XID (Extended Identification data packet) to the wireless power transmitter 1010 (S1202). In addition, the wireless power receiver 1020 may transmit a power control hold-off data packet (PCH) to the wireless power transmitter 1010 for a power transfer contract (S1203). In addition, the wireless power receiver 1020 may transmit a configuration data packet (CFG) to the wireless power transmitter (S1204).

In accordance with the Extended Protocol for EPP, the wireless power transmitter 1010 may transmit an ACK in response to the CFG (S1205).

FIG. 11 is a diagram illustrating a message field of a configuration packet (CFG) of a wireless power receiver according to an embodiment.

A configuration packet (CFG) according to an embodiment may have a header value of 0x51 and may include a message field of 5 bytes, referring to FIG. 11.

Referring to FIG. 11, the message field of the configuration packet CFG may include a 1-bit authentication (AI) flag, and a 1-bit out-of-band (OB) flag.

The authentication flag AI indicates whether the wireless power receiver 1020 supports the authentication function. For example, if the value of the authentication flag AI is '1', it indicates that the wireless power receiver 1020 supports an authentication function or operates as an authentication initiator, if the value of the authentication flag AI is '0', it may indicate that the wireless power receiver 1020 does not support an authentication function or cannot operate as an authentication initiator.

The out-band (OB) flag indicates whether the wireless power receiver 1020 supports out-band communication. For example, if the value of the out-band (OB) flag is '1', the wireless power receiver 1020 instructs out-band communication, if the value of the out-band (OB) flag is '0', it may indicate that the wireless power receiver 1020 does not support out-band communication.

In the configuration phase, the wireless power transmitter 1010 may receive the configuration packet (CFG) of the wireless power receiver 1020 and check whether the wireless power receiver 1020 supports an authentication function and supports out-of-band communication.

Figure 12:
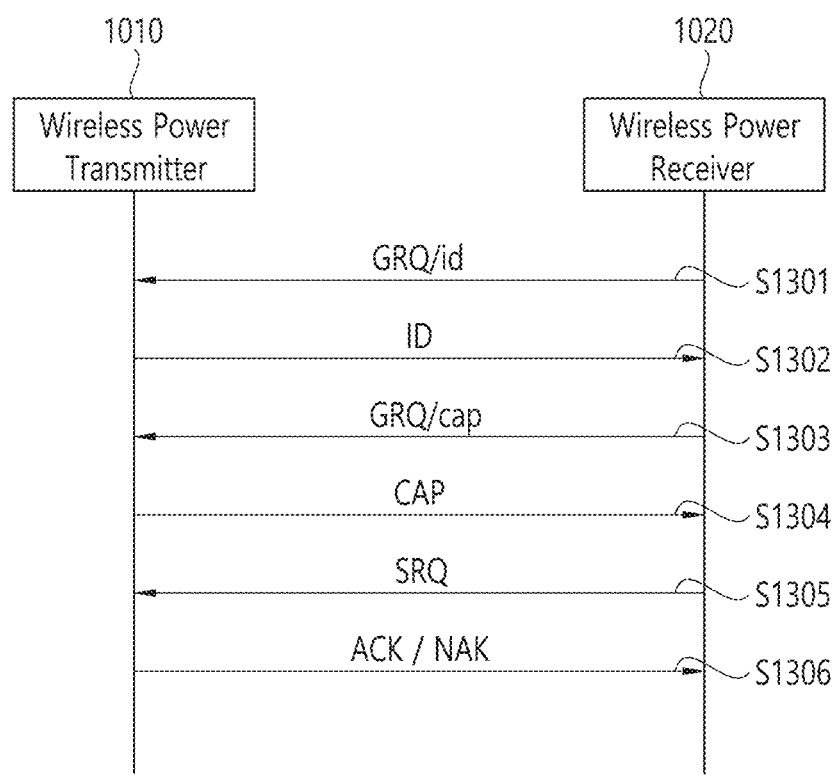
FIG. 12 is a flowchart schematically illustrating a protocol of a negotiation step or a renegotiation step according to an embodiment.

FIG. 12 is a flowchart schematically illustrating a protocol of a negotiation step or a renegotiation step according to an embodiment.

In the negotiation phase or renegotiation phase, the power transfer contract related to the reception/transmission of wireless power between the wireless power receiver and the wireless power transmitter is expanded or changed, or a renewal of the power transfer contract is made that adjusts at least some of the elements of the power transfer contract, or exchange of information for establishing out-band communication may be performed.

Referring to FIG. 12, in the negotiation phase, the wireless power receiver 1020 may receive an identification data packet (ID) and a capabilities data packet (CAP) of the wireless power transmitter 1010 using a general request data packet (GRQ).

The general request packet (GRQ) may have a header value of 0x07 and may include a 1-byte message field. The message field of the general request packet (GRQ) may include a header value of a data packet that the wireless power receiver 1020 requests from the wireless power transmitter 1010 using the GRQ packet. For example, when the wireless power receiver 1020 requests an ID packet of the wireless power transmitter 1010 using a GRQ packet, the wireless power receiver 1020 transmits a general request packet (GRQ/id) including a header value (0x30) of the ID packet of the wireless power transmitter 1010 in the message field of the general request packet (GRQ).

Referring to FIG. 12, in the negotiation phase or renegotiation phase, the wireless power receiver 1020 may transmit a GRQ packet (GRQ/id) requesting the ID packet of the wireless power transmitter 1010 to the wireless power transmitter 1010 (S1301).

The wireless power transmitter 1010 receiving the GRQ/id may transmit the ID packet to the wireless power receiver 1020 (S1302). The ID packet of the wireless power transmitter 1010 includes information on the Manufacturer Code. The ID packet including information on the Manufacturer Code allows the manufacturer of the wireless power transmitter 1010 to be identified.

Referring to FIG. 12, in the negotiation phase or renegotiation phase, the wireless power receiver 1020 may transmit a GRQ packet (GRQ/cap) requesting a capability packet (CAP) of the wireless power transmitter 1010 to the wireless power transmitter 1010 (S1303). The message field of the GRQ/cap may include a header value (0x31) of the capability packet (CAP).

The wireless power transmitter 1010 receiving the GRQ/cap may transmit a capability packet (CAP) to the wireless power receiver 1020 (S1304).

FIG. 13 is a diagram illustrating a message field of a capability packet (CAP) of a wireless power transmitter according to an embodiment.

A capability packet (CAP) according to an embodiment may have a header value of 0x31, and referring to FIG. 13, may include a message field of 3 bytes.

Referring to FIG. 13, a 1-bit authentication (AR) flag and a 1-bit out-of-band (OB) flag may be included in the message field of the capability packet (CAP).

The authentication flag AR indicates whether the wireless power transmitter 1010 supports the authentication function. For example, if the value of the authentication flag AR is '1', it indicates that the wireless power transmitter 1010 supports an authentication function or can operate as an authentication responder, if the value of the authentication flag AR is '0', it may indicate that the wireless power transmitter 1010 does not support the authentication function or cannot operate as an authentication responder.

The out-band (OB) flag indicates whether the wireless power transmitter 1010 supports out-band communication. For example, if the value of the out-band (OB) flag is '1', the wireless power transmitter 1010 instructs out-band communication, if the value of the out-band (OB) flag is '0', it may indicate that the wireless power transmitter 1010 does not support out-band communication.

In the negotiation phase, the wireless power receiver 1020 receives a capability packet (CAP) of the wireless power transmitter 1010, it is possible to check whether the wireless power transmitter 1010 supports an authentication function, supports out-of-band communication, and the like.

And, according to FIG. 12, in the negotiation phase or re-negotiation phase, the wireless power receiver 1020 may use at least one specific request packet (SRQ, Specific Request data packet) to update the elements of the Power Transfer Contract related to the power to be provided in the power transfer phase, the negotiation phase or the re-negotiation phase may be ended (S1305).

The wireless power transmitter 1010 may transmit only ACK, only ACK or NAK, or only ACK or ND in response to the specific request packet SRQ according to the type of the specific request packet SRQ (S1306).

In the above-described ping phase, configuration phase, and negotiation/renegotiation phase, a data packet or message exchanged between the wireless power transmitter 1010 and the wireless power receiver 1020 may be transmitted/received through in-band communication.

Figure 14:
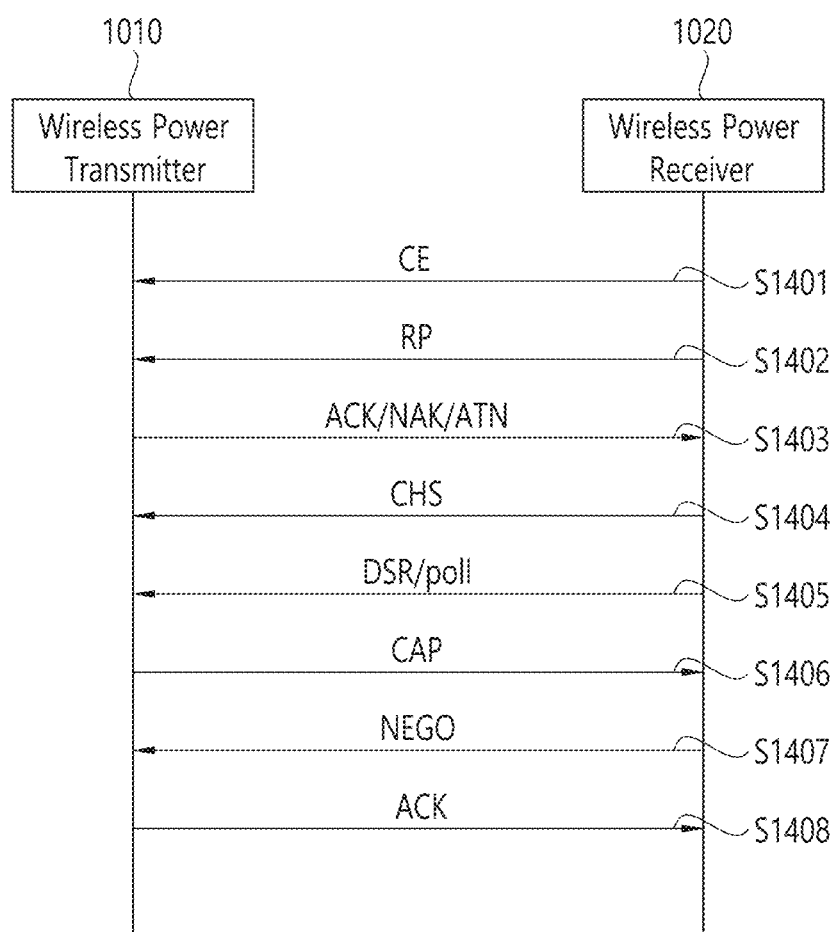
FIG. 14 is a flowchart schematically illustrating a protocol of a power transmission step according to an embodiment.

FIG. 14 is a flowchart schematically illustrating a protocol of a power transmission step according to an embodiment.

In the power transfer phase, the wireless power transmitter 1010 and the wireless power receiver 1020 may transmit/receive wireless power based on a power transfer contract.

Referring to FIG. 14, in the power transfer phase, the wireless power receiver 1020 transmits a control error data packet (CE) including information on the difference between the actual operating point and the target operating point to the wireless power transmitter 1010 (S1401).

Also, in the power transfer phase, the wireless power receiver 1020 transmits a received power packet (RP, Received Power data packet) including information on the received power value of the wireless power received from the wireless power transmitter 1010 to the wireless power transmitter 1010 (S1402).

In the power transfer phase, the control error packet (CE) and the received power packet (RP) are data packets that are repeatedly transmitted/received according to timing constraints required for wireless power control.

The wireless power transmitter 1010 may control the level of wireless power transmitted based on the control error packet (CE) and the received power packet (RP) received from the wireless power receiver 1020.

The wireless power transmitter 1010 may respond with an 8-bit bit pattern such as ACK, NAK, ATN, etc. to the received power packet (RP) (S1403).

For a received power packet (RP/0) with a mode value of 0, when the wireless power transmitter 1010 responds with ACK, it means that power transmission can continue at the current level.

For a received power packet (RP/0) with a mode value of 0, when the wireless power transmitter 1010 responds with NAK, it means that the wireless power receiver 1020 should reduce power consumption.

For a received power packet (RP/1 or RP/2) having a mode value of 1 or 2, when the wireless power transmitter 1010 responds with ACK, it means that the wireless power receiver 1020 has accepted the power correction value included in the received power packet (RP/1 or RP/2).

For a received power packet (RP/1 or RP/2) having a mode value of 1 or 2, when the wireless power transmitter 1010 responds with NAK, it means that the wireless power receiver 1020 does not accept the power correction value included in the received power packet RP/1 or RP/2.

About Receive Power Packet (RP), when the wireless power transmitter 1010 responds with ATN, it means that the wireless power transmitter 1010 requests permission for communication.

The wireless power transmitter (1010) and the wireless power receiver (1020) can control the transmitted/received power level based on a control error packet (CE), a received power packet (RP), and a response to the received power packet (RP).

Also, in the power transfer phase, the wireless power receiver 1020 transmits a charge status data packet (CHS) including information on the charge state of the battery to the wireless power transmitter 1010 (S1404). The wireless power transmitter 1010 may control the power level of the wireless power based on the information on the state of charge of the battery included in the state of charge packet (CHS).

Meanwhile, in the power transfer phase, the wireless power transmitter 1010 and/or the wireless power receiver 1020 may enter a renegotiation phase to renew the power transfer contract.

In the power transfer phase, when the wireless power transmitter 1010 wants to enter the renegotiation phase, the wireless power transmitter 1010 responds to the received power packet (RP) with ATN. In this case, the wireless power receiver 1020 may transmit a DSR/poll packet to the wireless power transmitter 1010 to give the wireless power transmitter 1010 an opportunity to transmit a data packet (S1405).

When the wireless power transmitter 1010 transmits a performance packet (CAP) to the wireless power receiver 1020 in response to the DSR/poll packet (S1406), the wireless power receiver 1020 transmits a renegotiation packet (NEGO) requesting the progress of the re-negotiation phase to the wireless power transmitter 1010 (S1407), when the wireless power transmitter 1010 responds with an ACK to the renegotiation packet (NEGO) (S1408), the wireless power transmitter 1010 and the wireless power receiver 1020 enter a re-negotiation phase.

In the power transfer phase, when the wireless power receiver 1020 wants to enter the re-negotiation phase, the wireless power receiver 1020 transmits a renegotiation packet (NEGO) requesting the progress of the re-negotiation phase to the wireless power transmitter 1010 (S1407), when the wireless power transmitter 1010 responds with an ACK to the renegotiation packet (NEGO) (S1408), the wireless power transmitter 1010 and the wireless power receiver 1020 enter a re-negotiation phase.

Hereinafter, a foreign object detection method during power transfer will be described.

When a wireless power transmitter transmits wireless power to a wireless power receiver using a magnetic field, if a foreign object exists around the wireless power transmitter, some of the magnetic field is absorbed by the foreign object. Accordingly, some of the wireless power transmitted by the wireless power transmitter is absorbed by the foreign object, and the rest is supplied to the wireless power receiver.

From the viewpoint of power transmission efficiency, transmission power loss occurs as much as the power or energy absorbed by the foreign object. In this way, since a causal relationship can be established between the existence of a foreign object and power loss (Ploss), the wireless power transmitter can detect a foreign object through how much power loss occurs.

In particular, various methods can be used as a foreign object detection method during power transmission, a method of stopping power transmission for a short period of time and performing foreign object detection within a short period of time during which power transmission is stopped may be used. The short time during which power transmission is stopped can be referred to as slot time, a method of stopping power transmission during the slot time and detecting a foreign object may be referred to as foreign object detection using a slot, Slotted FOD, or Slot FOD. Hereinafter, it is collectively referred to as Slotted FOD.

Since the slotted FOD stops power transmission for a short time, the wireless power reception can be continuously maintained without a large reduction in the rectified voltage of the wireless power receiver during the time of detecting the foreign object, since it does not affect the operation of the wireless power receiver, there is an advantage that the operation of the wireless power receiver can be continuously maintained.

Among Slotted FODs, in the power transfer phase, there is a Slotted Q FOD in which a wireless power transmitter stops power transmission for a short time and detects a foreign object from a change in current and/or voltage that is naturally reduced in a resonant circuit including a primary coil.

Figure 15:
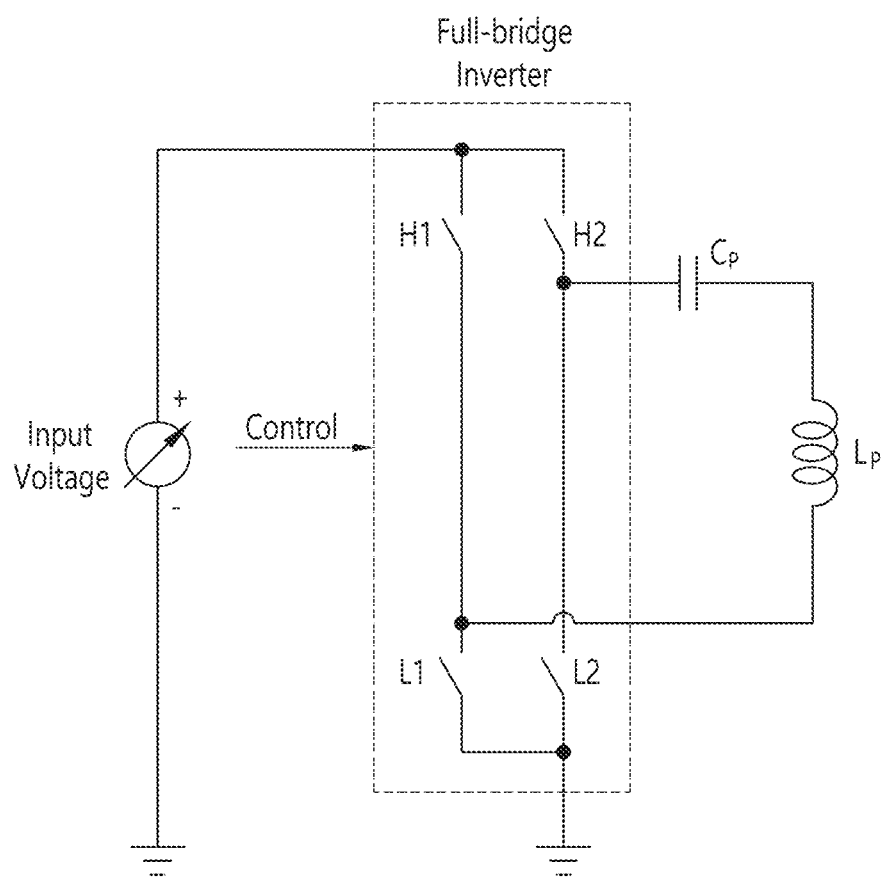
FIG. 15 is a schematic circuit diagram of a wireless power transmitter supporting a foreign object detection method by Slotted Q FOD.
Figure 16:
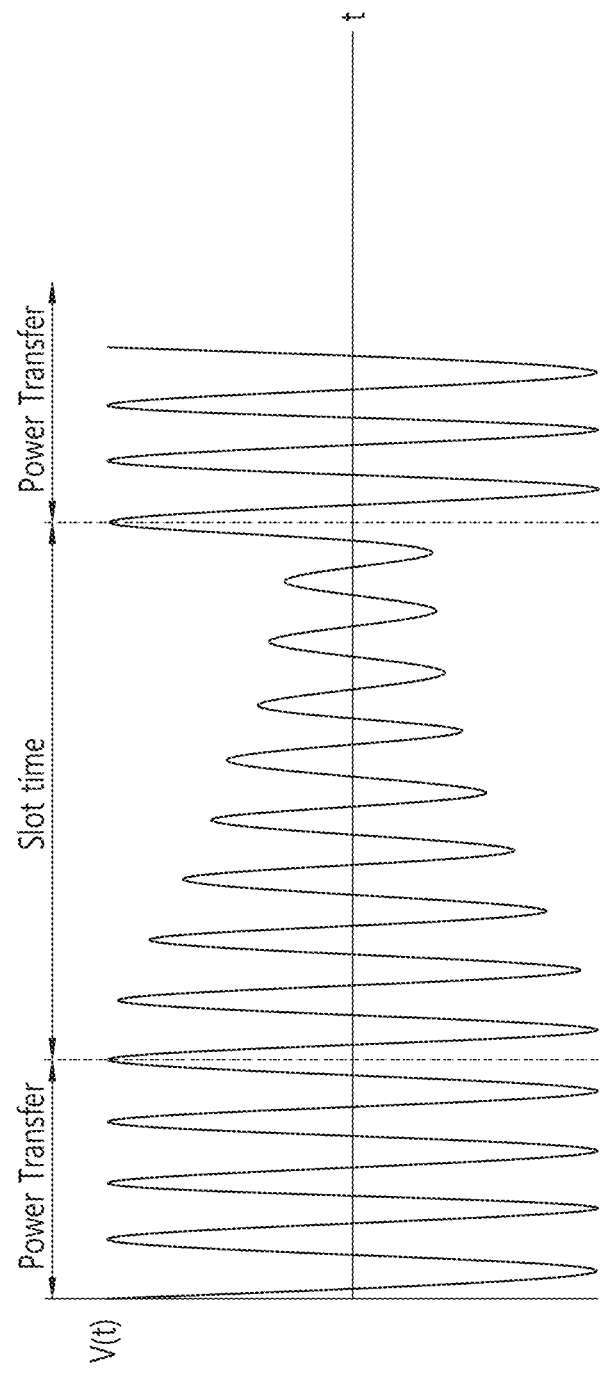
FIG. 16 is a graph schematically showing a voltage attenuation waveform of a primary coil during a slot time.

FIG. 15 is a schematic circuit diagram of a wireless power transmitter supporting a foreign object detection method by Slotted Q FOD, and FIG. 16 is a graph schematically showing a voltage attenuation waveform of a primary coil during a slot time.

Referring to FIG. 15, the power conversion circuit of the wireless power transmitter may be outlined as an LC circuit including a full bridge inverter including four switches H1, H2, L1, and L2.

In the power transfer phase, the wireless power transmitter receives power from a power supply source expressed as an input voltage and provides wireless power to the wireless power receiver through the primary coil Lp. At this time, the four switches (H1, H2, L1, L2) of the full bridge inverter are controlled to form a circuit consisting of an input voltage—a capacitor (Cp)—a primary coil (Lp). Referring to FIG. 16, a sine wave voltage having a substantially constant peak value may be applied to the primary coil Lp in the power transfer phase.

When forming a slot time for foreign object detection, the full bridge inverter has H1 and H2 switches open, when the L1 and L2 switches are switched to the closed state, the wireless power transmitter forms a closed-loop resonant circuit consisting of a capacitor (Cp) and a primary coil (Lp), the supply of power to the resonant circuit is cut off.

Referring to FIG. 16, during the slot time, the voltage (or current) of the primary coil Lp oscillates in a waveform having a resonant frequency according to the capacitance of the capacitor Cp and the inductance characteristics of the primary coil Lp, it is gradually attenuated by the resistance affecting the resonant circuit. The quality factor (Q factor) of the LC resonant circuit can be measured from the damping ratio (or damping coefficient) of the voltage (or current). And, if a foreign object adjacent to the wireless power transmission device exists, since the Q factor is generally measured lower, the presence of a foreign object can be determined from the Q factor measured within the slot time or the voltage (or current) waveform of the primary coil Lp measured within the slot time.

As described above, the foreign object detection method by Slotted Q FOD is a method of cutting off external power during the slot time, forming a resonance circuit including a primary coil, measuring a Q factor from a voltage (or current) waveform of the primary coil Lp during a slot time, and detecting the presence of a foreign object based on this.

However, in the power transfer phase, the current flowing through the primary coil Lp and the voltage applied to the primary coil Lp continuously change with time as a sine wave. Therefore, according to the start time of the slot time, the current flowing through the primary coil Lp and the voltage applied to the primary coil Lp may vary, this results in a voltage waveform or current waveform of the primary coil (Lp) stage being different each time during the slot time. In addition, since the Q factor measured depending on the voltage waveform or current waveform of the primary coil (Lp) stage is also inconsistent, reliability of foreign object detection results by Slotted Q FOD may be weakened.

Hereinafter, a method for more accurately measuring a Q factor measured within a slot time and a foreign object detection method using the same will be described.

Figure 17:
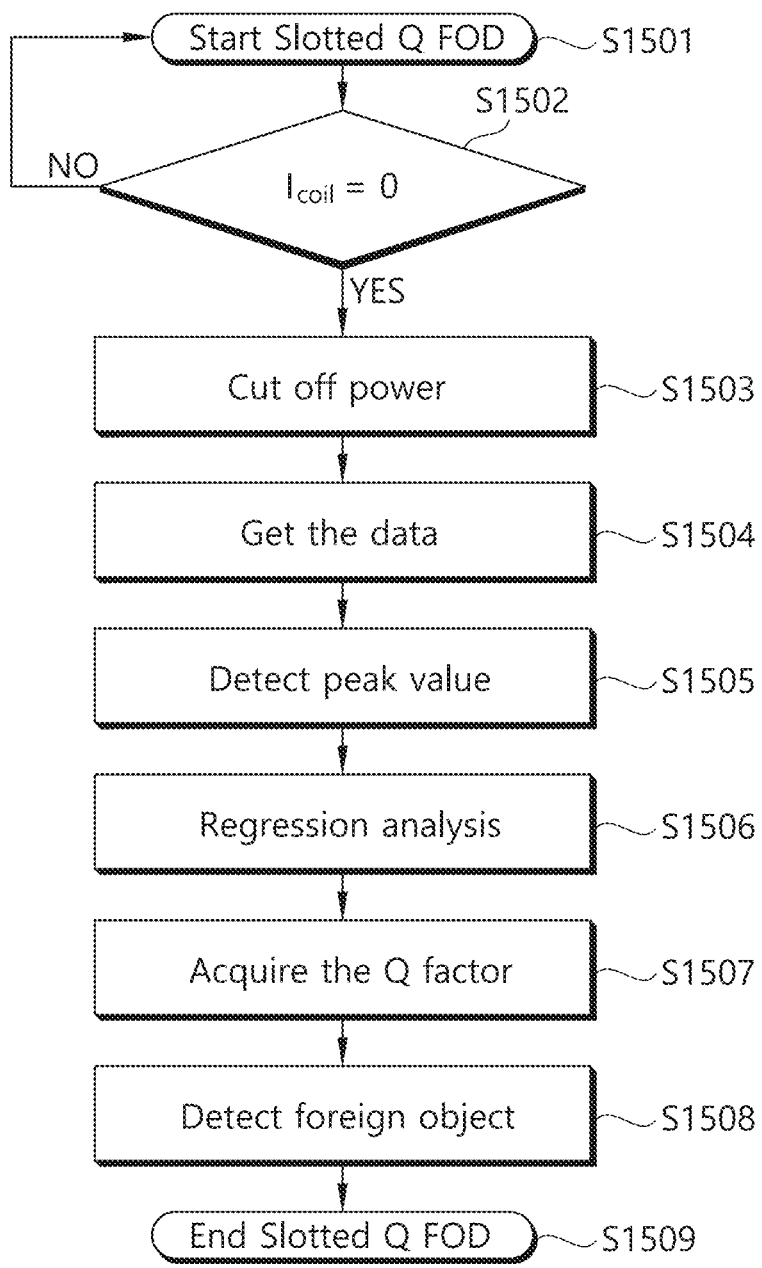
FIG. 17 is a flowchart illustrating a foreign object detection method according to an embodiment.

FIG. 17 is a flowchart illustrating a foreign object detection method according to an embodiment.

Referring to FIG. 17, when the Slotted Q FOD starts (S1501), the communication/control circuit of the wireless power transmitter detects the time when the current of the primary coil (Lp) becomes 0 (S1502).

The time point at which the current in the primary coil (Lp) becomes zero may be a time point when the value of the AC current flowing in the primary coil Lp is converted from a positive value to a negative value or a time point when the value is converted from a negative value to a positive value.

If the wireless power transmitter includes a configuration capable of monitoring the current value of the primary coil (Lp), the communication/control circuit of the wireless power transmitter can receive the current value of the primary coil (Lp) from the above configuration and can easily detect the point in time when the current of the primary coil (Lp) becomes zero.

However, if the wireless power transmitter does not have a configuration capable of monitoring the current value of the primary coil (Lp), the communication/control circuit of the wireless power transmission device may detect a time point having a phase difference of 90 degrees from the time point at which the voltage value of the primary coil Lp becomes 0 as the time point at which the current in the primary coil Lp becomes 0. This is because the voltage and current of the primary coil Lp have a phase difference of 90 degrees.

The communication/control circuit of the wireless power transmitter cuts off power transmitted to the primary coil Lp in the power transfer phase when the current of the primary coil Lp becomes zero (S1503). For example, as described with reference to FIG. 15, the communication/control circuit controls the four switches (H1, H2, L1, L2) of the full bridge inverter, constitutes a closed-loop resonant circuit composed of a capacitor Cp—the primary coil Lp and can cut off power transmitted to the primary coil Lp. Or, for example, controlling the power transmitted to the primary coil Lp in the power transfer phase to be OFF, a closed-loop resonant circuit composed of a capacitor Cp and a primary coil Lp may be configured to block power transmitted to the primary coil Lp.

When the power transmitted to the primary coil (Lp) is cut off in the power transfer phase, the slot time starts. Therefore, the slot time starts at the time when the current of the primary coil Lp becomes zero. According to this embodiment, since the starting point of the slot time for the Slotted Q FOD is maintained at the point at which the current of the primary coil Lp becomes 0, a more consistent and reliable Q factor can be obtained.

The communication/control circuit of the wireless power transmitter acquires data on the voltage value across the primary coil (Lp) or the current value flowing through the primary coil (Lp) during the slot time (S1504).

Figure 18:
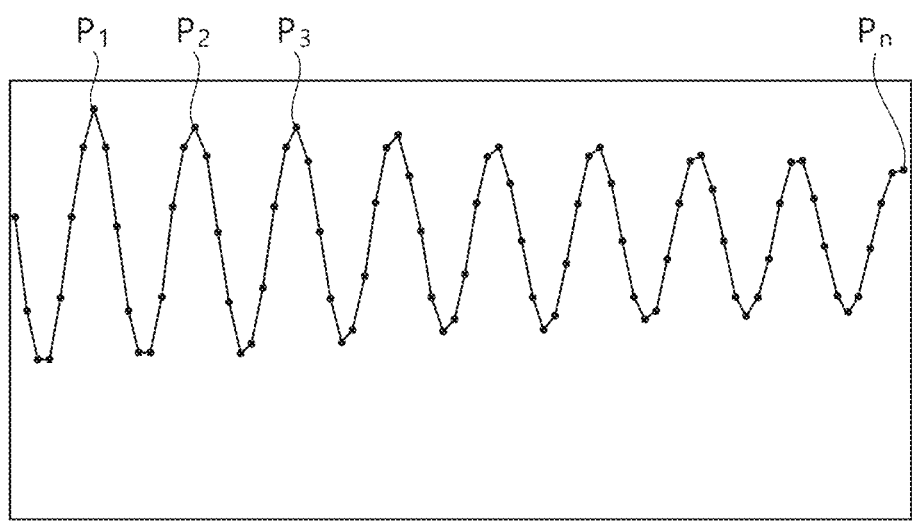
FIG. 18 is a diagram showing an example of data acquired in step S1504.

FIG. 18 is a diagram showing an example of data acquired in step S1504.

Referring to FIG. 18, the communication/control circuit of the wireless power transmitter records the voltage value across the primary coil Lp or the current value flowing through the primary coil Lp at various times within the slot time.

Thereafter, the communication/control circuit of the wireless power transmitter detects peak values of the voltage value or current value of the primary coil (Lp) within the slot time based on the data obtained in step S1504 (S1505).

Referring to FIG. 18, the communication/control circuit of the wireless power transmitter may detect peak values $(P_1, P_2, P_3, \ldots, P_n)$ of the attenuation waveform based on the values of the data obtained in step S1504.

Thereafter, the communication/control circuit of the wireless power transmitter may perform regression analysis based on the peak values detected in step S1505 (S1506).

However, the communication/control circuit of the wireless power transmitter may obtain effective peak values to be subjected to regression analysis among the peak values detected in step S1505.

Figure 19:
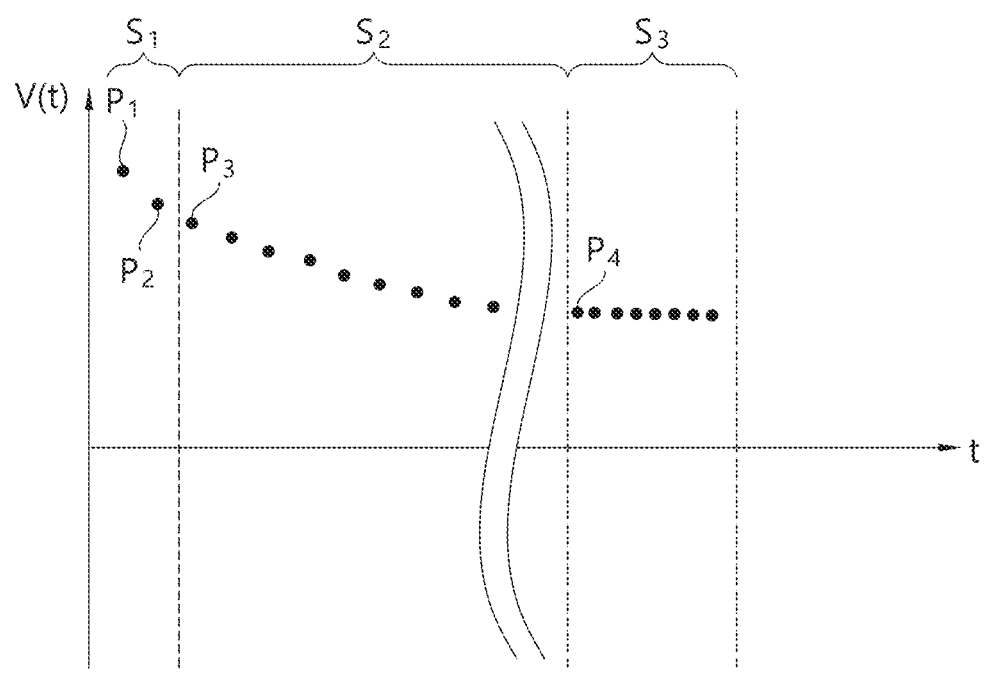
FIG. 19 is a diagram for explaining a method of obtaining effective peak values according to an exemplary embodiment.

FIG. 19 is a diagram for explaining a method of obtaining effective peak values according to an exemplary embodiment.

Referring to FIG. 19, among the detected peak values $(P_1, P_2, P_3, \ldots, P_n)$, the communication/control circuit of the wireless power transmitter may obtain effective peak values excluding the peak values $P_1$ and $P_2$ of the initial period $S_1$.

Theoretically, since the peak values detected within the slot time are values measured in the RLC resonance circuit, they should form a specific exponential function, peak values derived from various experiments generally have an exponential trend, but it is not defined as a single exponential function. In particular, among the peak values detected within the slot time, the peak value of the initial section $(S_1)$ tended to adversely affect the regression analysis result. It is presumed that after the resonance circuit is configured, other influences other than the characteristics of the resonance circuit are initially applied to the voltage value or current value of the primary coil Lp in a transient state.

Thus, in this embodiment, among the detected peak values $(P_1, P_2, P_3, \ldots, P_n)$, a method of obtaining effective peak values excluding the peak values $P_1$ and $P_2$ of the initial period $S_1$ is proposed.

The length of the initial section $S_1$ may be determined differently according to embodiments. For example, only the first peak value $P_1$ may be included in the initial period $S_1$, or two or more first peak values may be included.

In addition, among the detected peak values ($P_1$, $P_2$, $P_3$, ..., $P_n$), the communication/control circuit of the wireless power transmitter may obtain an effective peak value except for the peak value $P_4$ of the latter period $S_3$.

The second half section ($S_3$) may be a section in which the deviation of the peak values ($P_4$) is less than a certain level. Alternatively, the second half section $S_3$ may be a section in which the peak values $P_4$ have values substantially close to zero.

Since the peak values ($P_4$) of the latter period ($S_3$) may also act as factors that adversely affect the regression analysis result, in this embodiment, a method of obtaining an effective peak value excluding the peak value $P_4$ of the second half section $S_3$ among the detected peak values $P_1$, $P_2$, $P_3$, ..., $P_n$ is proposed.

Alternatively, the second half section $S_3$ may be determined according to the number of acquired valid peak values. For example, when 15 are predetermined as the number of valid peak values for regression analysis, a section in which peak values exist after 15 valid peak values are obtained may be a second half section $S_3$.

Meanwhile, for continuity of providing wireless power to the wireless power receiver, the slot time is preferably formed within 100 µs. In order to reduce the slot time as much as possible, after a preset number of effective peak values are obtained, the slot time is ended and wireless power transmission may be resumed.

Figure 20:
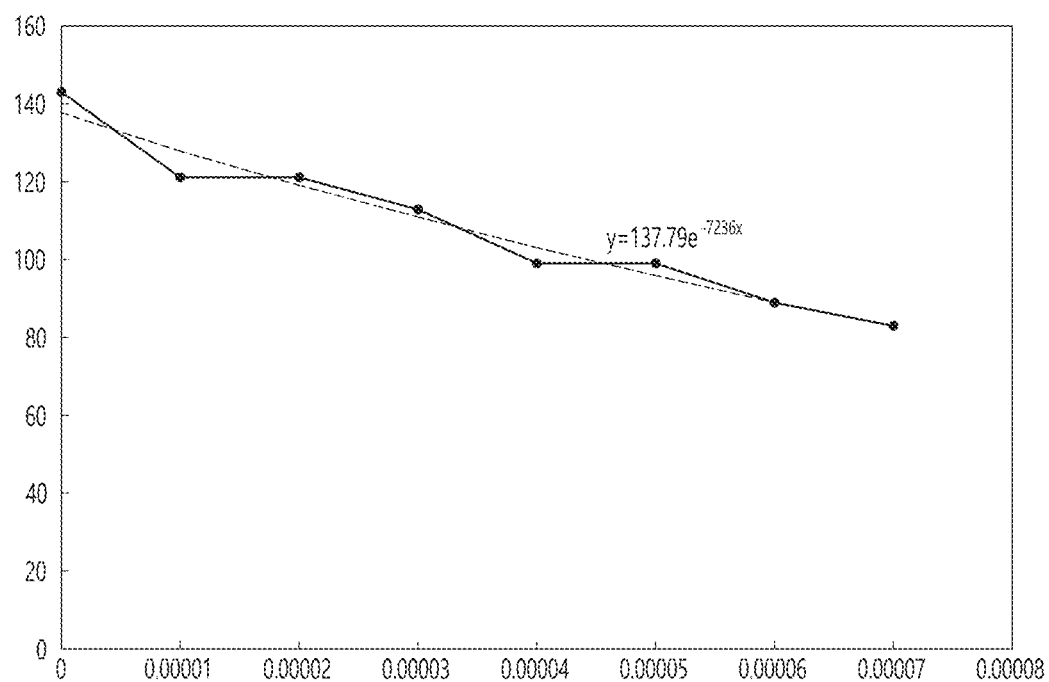
FIG. 20 is a diagram for explaining a regression analysis method according to an embodiment.

FIG. 20 is a diagram for explaining a regression analysis method according to an embodiment.

The communication/control circuit of the wireless power transmitter may derive an exponential function that is an envelope of effective peak values through regression analysis based on a plurality of effective peak values.

FIG. 20 shows an example in which an exponential function of $y=137.79e^{-7236x}$ is derived based on 9 effective peak values.

When an exponential function, which is an envelope of effective peak values, is derived, the communication/control circuit of the wireless power transmitter may obtain a Q factor based on the exponential function (S1507).

The exponential function can be expressed as $N(t)=N_0 e^{-t/\tau}$, and in the exponential function shown in FIG. 20, a time constant ($\tau$) becomes 1/7236.

The correlation between the Q factor, the damping ratio ($\zeta$), and the time constant ($\tau$) can be expressed by the following equation.

$$Q = \frac{1}{\zeta} = \frac{w_0}{2\alpha} = \frac{\tau w_0}{2} = \pi \tau f_0 \qquad \text{[Equation 1]}$$

When the f0 value is 111000 (Hz), the Q factor value is calculated to be about 48.17 based on the exponential function of FIG. 20.

As such, the communication/control circuit of the wireless power transmitter may calculate and obtain the value of the Q factor using the time constant $\tau$ of the exponential function derived in step S1506.

The communication/control circuit of the wireless power transmitter may detect a foreign object between the wireless power transmitter and the wireless power receiver using the acquired Q factor (S1508).

For example, the communication/control circuit of the wireless power transmitter may compare the Q factor value obtained in step S1507 with a previously stored Q factor value to estimate the presence of a foreign object. That is, as the Q factor value acquired in step S1507 is lower than the previously stored Q factor value, the possibility of existence of a foreign object increases. Therefore, the communication/control circuit of the wireless power transmitter when the difference between the pre-stored Q factor value and the Q factor value obtained in step S1507 is greater than the threshold value, it can be determined that a foreign object exists.

The pre-stored Q factor value may be a pre-measured Q factor value in the absence of a foreign object or a Q factor value received from the wireless power receiver.

The communication/control circuit of the wireless power transmitter may transmit information (data packet or response pattern) according to the detection result of the foreign object to the wireless power receiver, and terminate the Slotted Q FOD (S1509).

As described above, according to the present embodiment, in performing Slotted Q FOD, by setting the starting point of the slot time to the point at which the current of the primary coil Lp becomes, it enables a more consistent and reliable Q factor to be obtained.

Also, according to this embodiment, in performing Slotted Q FOD, an exponential function, which is the envelope of effective peak values, is derived through regression analysis using a plurality of effective peak values, and a Q factor is obtained based on this, it enables more reliable Q factor acquisition.

Also, according to this embodiment, in performing Slotted Q FOD, since the effective peak values are selected excluding the peak values of the early section and/or the latter section among the obtained peak values, it enables more reliable Q factor acquisition.

Meanwhile, in the following description, a method of obtaining a reference Q factor value serving as a comparison standard of the Q factor value obtained when determining the existence possibility of a foreign object in step S1508 will be described.

Figure 21:
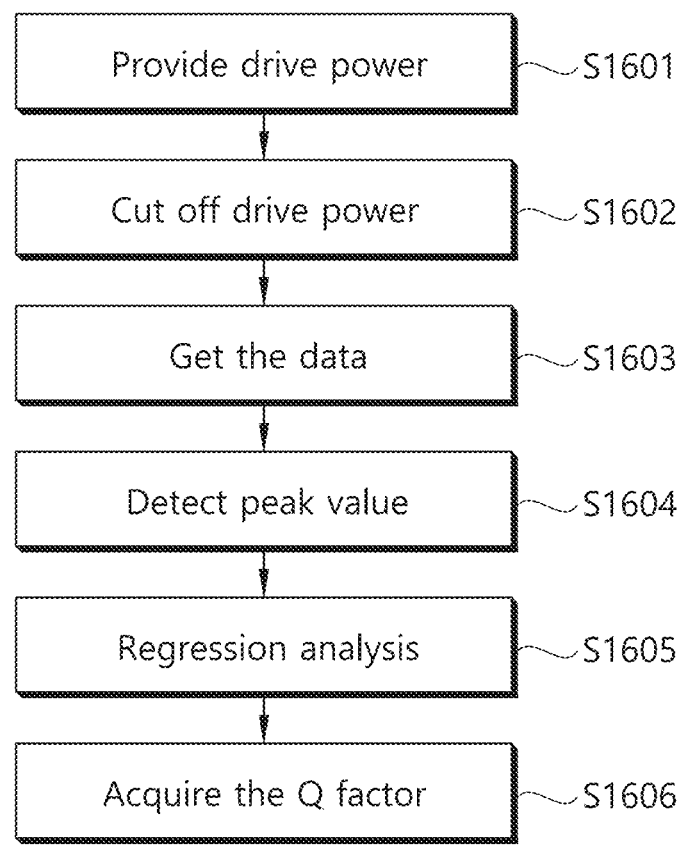
FIG. 21 is a flowchart for explaining a method of obtaining a reference Q factor according to an embodiment.

FIG. 21 is a flowchart for explaining a method of obtaining a reference Q factor according to an embodiment.

The method for obtaining a reference Q factor described with reference to FIG. 21 is performed before transmitting wireless power to a wireless power receiver, for example, the ping step may be performed in a state in which an object does not exist in the operating volume of the wireless power transmitter, that is, above the primary coil. Therefore, the method of acquiring the reference Q factor according to the present embodiment may be performed before transmitting a digital ping to the wireless power receiver.

The communication/control circuit of the wireless power transmitter provides driving power to the primary coil in order to obtain a reference Q factor of the wireless power transmitter (S1601).

The driving power may be at least one pulse signal.

After providing at least one pulse signal to the primary coil, the communication/control circuit blocks driving power (S1602).

The communication/control circuit may constitute a closed-loop resonant circuit composed of a capacitor Cp and a primary coil Lp while cutting off driving power. For example, as described above with reference to FIG. 15, the communication/control circuit controls the four switches H1, H2, L1, and L2 of the full bridge inverter to configure a closed-loop resonant circuit composed of a capacitor Cp-primary coil Lp.

Due to the applied driving power, in the closed-loop resonant circuit composed of capacitor Cp-primary coil Lp, the voltage (or current) of the primary coil Lp oscillates in a waveform having a resonant frequency according to the capacitance of the capacitor Cp and the inductance characteristics of the primary coil Lp, it is gradually attenuated by the resistance affecting the resonant circuit.

The communication/control circuit of the wireless power transmitter acquires data on the voltage value across the primary coil (Lp) or the current value flowing through the primary coil (Lp) (S1603).

In the foregoing embodiment, similar to what was described with reference to FIG. 18, the communication/control circuit of the wireless power transmitter records the voltage value across the primary coil (Lp) or the current value flowing through the primary coil (Lp) at various points in time within the slot time.

Thereafter, the communication/control circuit of the wireless power transmitter detects peak values of the voltage value or current value of the primary coil Lp based on the data obtained in step S1603 (S1604).

In the foregoing embodiment, similar to that described with reference to FIG. 18, the communication/control circuit of the wireless power transmitter may detect peak values $P_1$, $P_2$, $P_3$, ..., $P_n$ of the attenuation waveform.

Thereafter, the communication/control circuit of the wireless power transmitter may perform regression analysis based on the peak values detected in step S1604 (S1605).

However, the communication/control circuit of the wireless power transmitter may obtain effective peak values to be subjected to regression analysis among the peak values detected in step S1604.

In the foregoing embodiment, similarly to that described with reference to FIG. 19, among the detected peak values ($P_1$, $P_2$, $P_3$, ..., $P_n$), the communication/control circuit of the wireless power transmitter may obtain an effective peak value excluding the peak values $P_1$ and $P_2$ of the initial period $S_1$ and/or the peak value $P_4$ of the second period $S_3$. Since specific details thereof have been described with reference to FIG. 19, additional description thereof will be omitted.

The communication/control circuit of the wireless power transmitter may derive an exponential function that is an envelope of effective peak values through regression analysis based on a plurality of effective peak values.

When an exponential function, which is an envelope of effective peak values, is derived, the communication/control circuit of the wireless power transmitter may obtain a reference Q factor based on the exponential function (S1606).

Since the method of calculating the Q factor using the time constant $\tau$ of the exponential function has been described with reference to FIG. 20 and the like, further description thereof will be omitted.

Since the method for obtaining the reference Q factor according to the present embodiment uses at least one pulse signal as driving power, it may be called Impulse Q, and the obtained reference Q factor may be called Impulse Q factor.

The communication/control circuit of the wireless power transmitter may detect an operating volume, that is, an object existing above the primary coil, in the ping phase using the obtained reference Q factor.

For example, the communication/control circuitry of a wireless power transmitter can estimate the presence of an object existing in the action space by comparing the obtained reference Q factor with a previously stored Q factor (a Q factor measured in a state where no object exists in the action space). That is, as the obtained reference Q factor value is lower than the pre-stored Q factor value, the probability of existence of the object increases. Therefore, when the difference between the pre-stored Q factor value and the reference Q factor value obtained in step S1606 is greater than the threshold value, the communication/control circuit of the wireless power transmitter may determine that an object exists in the operating space.

In addition, by comparing the Q factor obtained through the Slotted Q FOD performed in the power transfer phase with the reference Q factor value obtained in step S1606, the communication/control circuit of the wireless power transmitter may detect a foreign object existing between the wireless power transmitter and the wireless power receiver.

The wireless power transmitter in the embodiment according to the above-described FIGS. 9 to 21 corresponds to the wireless power transmission apparatus or the wireless power transmitter or the power transmission unit disclosed in FIGS. 1 to 8. Accordingly, the operation of the wireless power transmitter in this embodiment is implemented by one or the same or more than two combinations of each component of the wireless power transmitter in FIGS. 1 to 8. For example, reception/transmission of a message or data packet according to FIGS. 9 to 21 is included in the operation of the communication/control unit.

The wireless power receiving apparatus in the embodiment according to the above-described FIGS. 9 to 21 corresponds to the wireless power receiving apparatus or the wireless power receiver or the power receiving unit disclosed in FIGS. 1 to 8. Accordingly, the operation of the wireless power receiver in this embodiment is implemented by one or the same or a combination of two or more of the respective components of the wireless power receiver in FIGS. 1 to 8. For example, reception/transmission of a message or data packet according to FIGS. 9 to 21 may be included in the operation of the communication/control unit.

Since all components or steps are not essential for the wireless power transmission method and apparatus, or the reception apparatus and method according to the embodiment of the present document described above, an apparatus and method for transmitting power wirelessly, or an apparatus and method for receiving power may be performed by including some or all of the above-described components or steps. In addition, the above-described wireless power transmission apparatus and method, or the embodiment of the reception apparatus and method may be performed in combination with each other. In addition, each of the above-described components or steps is not necessarily performed in the order described, and it is also possible that the steps described later are performed before the steps described earlier.

The above description is merely illustrative of the technical idea of the present document, those of ordinary skill in the art to which the present document pertains will be able to make various modifications and variations without departing from the essential characteristics of the present document. Accordingly, the embodiments of the present document described above may be implemented separately or in combination with each other.

Accordingly, the embodiments disclosed in the present document are not intended to limit the technical spirit of the present document, but to explain, and the scope of the technical spirit of the present document is not limited by these embodiments. The protection scope of the present document should be construed by the following claims, all technical ideas within the scope equivalent thereto should be construed as being included in the scope of the present document.

What is claimed is:

1. A wireless power transmitter configured to transmit a wireless power to a wireless power receiver, the wireless power transmitter comprising:
   a power conversion circuit including a primary coil for transmitting the wireless power to the wireless power receiver; and
   a communication/control circuit communicating with the wireless power receiver and controlling the power conversion circuit,
   wherein the communication/control circuit is configured to:
   stop a transmission of the wireless power during a slot time for detecting a foreign object between the wireless power receiver and the wireless power transmitter, and
   detect the foreign object based on a change in voltage or current of the primary coil within the slot time, and
   wherein the slot time starts from a time point at which the current of the primary coil becomes zero.

2. The wireless power transmitter of claim 1, wherein the communication/control circuit is configured to cause the slot time to start from a time point having a phase difference of 90 degrees from a time point when the voltage of the primary coil becomes zero.

3. The wireless power transmitter of claim 1, wherein the communication/control circuit is configured to:
   calculate an envelope based on peak values of current values or voltage values of the primary coil within the slot time, and
   detect the foreign object based on a time constant of the envelope.

4. The wireless power transmitter of claim 3, wherein the envelope is calculated based on effective peak values obtained excluding peak values of an initial section among the peak values.

5. The wireless power transmitter of claim 4, wherein the effective peak values are obtained by further excluding peak values of a latter section among the peak values.

6. The wireless power transmitter of claim 3, wherein the envelope is calculated through regression analysis based on the peak values.

7. The wireless power transmitter of claim 3, wherein the communication/control circuit is configured to:
   calculate a quality factor based on the time constant of the envelope, and
   detect the foreign object based on the calculated quality factor.

8. A method for detecting a foreign object, the method performed by a wireless power transmitter, wherein the wireless power transmitter includes a primary coil for transmitting wireless power to a wireless power receiver, the method comprising:
   supplying power to the primary coil to provide the wireless power to the wireless power receiver;
   blocking the power supplied to the primary coil during a slot time; and
   detecting the foreign object based on a change in voltage or current of the primary coil within the slot time,
   wherein the slot time starts from a time point at which the current of the primary coil becomes zero.

9. The method of claim 8, wherein the method comprising:
   causing the slot time to start from a time point having a phase difference of 90 degrees from a time point when the voltage of the primary coil becomes zero.

10. The method of claim 8, wherein the method comprising:
    calculating an envelope based on peak values of current values or voltage values of the primary coil within the slot time, and
    detecting the foreign object based on a time constant of the envelope.

11. The method of claim 10, wherein the envelope is calculated based on effective peak values obtained excluding peak values of an initial section among the peak values.

12. The method of claim 11, wherein the effective peak values are obtained by further excluding peak values of a latter section among the peak values.

13. The method of claim 10, wherein the envelope is calculated through regression analysis based on the peak values.

14. The method of claim 10, wherein the method comprising:
    calculating a quality factor based on the time constant of the envelope, and
    detecting the foreign object based on the calculated quality factor.

15. A wireless power transmitter configured to transmit a wireless power to a wireless power receiver, the wireless power transmitter comprising:
    a power conversion circuit including a primary coil for transmitting the wireless power to the wireless power receiver; and
    a communication/control circuit communicating with the wireless power receiver and controlling the power conversion circuit,
    wherein the communication/control circuit is configured to:
    stop a transmission of the wireless power during a slot time for detecting a foreign object between the wireless power receiver and the wireless power transmitter, and
    detect the foreign object based on a change in voltage or current of the primary coil within the slot time, and
    wherein the communication/control circuit is configured to detect the foreign object based on the change in effective peak values obtained excluding a peak value of an initial section among peak values of current values or voltage values of the primary coil generated within the slot time.

16. The wireless power transmitter of claim 15, wherein the communication/control circuit is configured to:
    calculate an envelope based on the effective peak values, and
    detect the foreign object based on a time constant of the envelope.

17. The wireless power transmitter of claim 16, wherein the envelope is calculated through regression analysis based on the peak values.

18. The wireless power transmitter of claim 16, wherein the communication/control circuit is configured to:
    calculate a quality factor based on the time constant of the envelope, and
    detect the foreign object based on the calculated quality factor.

19. The wireless power transmitter of claim 15, wherein the effective peak values are obtained by further excluding peak values of a latter section among the peak values.

20. The wireless power transmitter of claim 15, wherein the slot time starts from a time point at which the current of the primary coil becomes zero.

* * * * *